United States Patent
Ramorini et al.

(10) Patent No.: US 10,211,722 B2
(45) Date of Patent: Feb. 19, 2019

(54) ENERGY SCAVENGING INTERFACE WITH IMPEDANCE MATCHING, METHOD FOR IMPEDANCE MATCHING OF THE ENERGY SCAVENGING INTERFACE, AND ENERGY SCAVENGING SYSTEM USING THE ENERGY SCAVENGING INTERFACE

(71) Applicant: STMicroelectronics S.r.l., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 162 days.

(21) Appl. No.: 15/132,958

(22) Filed: Apr. 19, 2016

(65) Prior Publication Data
US 2016/0322830 A1   Nov. 3, 2016

(30) Foreign Application Priority Data

Apr. 29, 2015   (IT) .............................. TO2015A0234

(51) Int. Cl.
*H02M 3/04* (2006.01)
*H02J 50/10* (2016.01)
*H02J 7/02* (2016.01)

(52) U.S. Cl.
CPC .............. *H02M 3/04* (2013.01); *H02J 50/10* (2016.02); *H02J 7/025* (2013.01)

(58) Field of Classification Search
CPC ... F16P 3/00; F16P 3/20; H03K 17/00; H03K 17/102; H01H 59/00; H01H 59/0009;
(Continued)

(56) References Cited

U.S. PATENT DOCUMENTS

| | | | |
|---|---|---|---|
| 2014/0084900 A1 | 3/2014 | Ramorini et al. | |
| 2015/0234416 A1* | 8/2015 | Ramorini ................. | G05F 5/00 323/299 |

FOREIGN PATENT DOCUMENTS

| | | |
|---|---|---|
| EP | 2530821 A1 | 12/2012 |
| EP | 2530822 A1 | 12/2012 |
| EP | 2713500 A2 | 4/2014 |

OTHER PUBLICATIONS

Italian Search Report and Written Opinion for IT TO2015A000234 dated Jan. 12, 2016 (7 pages).
(Continued)

*Primary Examiner* — Lincoln Donovan
*Assistant Examiner* — David Mattison
(74) *Attorney, Agent, or Firm* — Crowe & Dunlevy

(57) ABSTRACT

An energy harvesting interface receives an electrical signal from an inductive transducer and outputs a supply signal. An input branch includes a first switch and a second switch connected in series between a first input terminal and an output terminal, and further a third switch and a fourth switch connected in series between a second input terminal and the output terminal. A first electrical-signal-detecting device coupled across the second switch detects a first threshold value of an electric storage current in the inductor of the transducer. A second electrical-signal-detecting device coupled across the fourth switch detects whether the electric supply current that flows through the fourth switch reaches a second threshold value lower than the first threshold value.

14 Claims, 14 Drawing Sheets

(58) Field of Classification Search
CPC . H01H 9/00; H01H 9/542; H02J 50/00; H02J 50/10; H02J 7/00; H02J 7/025; H02M 1/00; H02M 1/088; H02M 3/00; H02M 3/04
USPC .......................................................... 307/113
See application file for complete search history.

(56) References Cited

OTHER PUBLICATIONS

Dwari, Suman et al: "An Efficient AC-DC Step-Up Converter for Low-Voltage Energy Harvesting," IEEE Transactions on Power Electronics, vol. 25, No. 8, Aug. 2010, pp. 2188-2199.

* cited by examiner

ENERGY SCAVENGING INTERFACE WITH IMPEDANCE MATCHING, METHOD FOR IMPEDANCE MATCHING OF THE ENERGY SCAVENGING INTERFACE, AND ENERGY SCAVENGING SYSTEM USING THE ENERGY SCAVENGING INTERFACE

PRIORITY CLAIM

This application claims priority from Italian Application for Patent No. TO2015A000234 filed Apr. 29, 2015, the disclosure of which is incorporated by reference.

TECHNICAL FIELD

The present invention relates to an energy harvesting interface with impedance matching, to a method for impedance matching of the energy harvesting system, and to an energy harvesting system that uses the energy harvesting interface.

BACKGROUND

As is known, systems for harvesting energy (also known as "energy scavenging systems") from intermittent environmental-energy sources (i.e., ones that supply energy in an irregular way) have aroused and continue to arouse considerable interest in a wide range of technological fields. Typically, energy harvesting systems are configured to harvest, store, and transfer energy generated by mechanical or thermal sources to a generic load of an electrical type.

The mechanical energy is converted, by one or more appropriate transducers (for example, piezoelectric or electromagnetic devices) into electrical energy, which may be used for supplying an electrical load. In this way, the electrical load does not require batteries or other supply systems, which are cumbersome and present a low resistance in regard to mechanical stresses.

FIG. 1 is a schematic illustration in the form of functional blocks of an energy harvesting system of a known type. FIG. 2 shows, according to a simplified circuit representation, the energy harvesting system of FIG. 1.

The energy harvesting system of FIG. 1 comprises: a transducer 2, for example of an electromagnetic type, subject in use to environmental mechanical vibrations and configured to convert mechanical energy into electrical energy, typically into AC (alternating current) voltages; a scavenging interface 4, for example comprising a diode-bridge rectifier circuit (also known as Graetz bridge), configured to receive at input the AC signal generated by the transducer 2 and supplying at output a DC (direct current) signal for charging a capacitor 5 connected to the output of the rectifier circuit 4; and a DC-DC converter 6, connected to the capacitor 5 for receiving at input the electrical energy stored by the capacitor 5 and supplying it to an electrical load 8. Thus, the capacitor 5 has the function of element for storing energy, which is made available, when required, to the electrical load 8 for operation of the latter. This type of interface, which operates as a peak detector, presents some drawbacks.

The efficiency of the system 1 of FIG. 1 is markedly dependent upon the signal generated by the transducer 2. In the absence of the DC-DC converter 6, the efficiency rapidly drops to zero (i.e., the system 1 is unable to harvest environmental energy) when the amplitude of the signal of the transducer 2 (signal $V_{TRANSD}$) assumes a value lower, in absolute value, than $V_{OUT}+2V_{TH\_D}$ where $V_{OUT}$ is the voltage across the capacitor 5, and $V_{TH\_D}$ is the threshold voltage of the diodes that form the energy harvesting interface 4. If the amplitude of the signal $V_{TRANSD}$ of the transducer 2 is lower than twice the threshold voltage $V_{TH\_D}$ of the diodes of the rectifier of the energy harvesting interface 4 (i.e., $V_{TRANSD}<2V_{TH\_D}$), then the efficiency of the system 1 is zero, the voltage across the output capacitor 5 is zero, the environmental energy is not harvested, and the electrical load 8 is not supplied.

When the DC-DC converter 6 (of a boost type) is set between the output capacitor 5 and the electrical load 8, it is possible to make up for the drop in efficiency. However, in this situation, the current supplied by the transducer and rectified by the diode bridge is not regulated and is not actively controlled. Consequently, the impedance $R_{LOAD}$ represented schematically in FIG. 2 cannot be matched to the series impedance $R_S$ of the transducer 2. This in any case causes a global loss of efficiency of the system 1.

A further solution, which enables active control of the current supplied by the transducer 2, envisages use of an AC-DC converter. This solution, for example proposed by IEEE TRANSACTIONS ON POWER ELECTRONICS, Vol. 25, No. 8, Aug. 2010, pp. 2188-2199 (incorporated by reference), envisages the use of a closed-loop boost converter that exploits directly the series inductance of the transducer and generates a regulated voltage that charges the output capacitor. However, this solution presents some disadvantages. For instance, if the mean power made available by the transducer is less than the power required by the load, the regulated output voltage drops instantaneously. Furthermore, in this condition, the AC-DC converter is unable to make up immediately for the voltage drop on the output capacitor, harvesting further energy for supply of the electrical load. The energy harvesting efficiency is thus jeopardized. In addition, the load is not correctly supplied in so far as it does not receive sufficient energy from the energy harvesting interface.

In general, to obtain the maximum transfer of energy between a transducer and a load by means of an energy harvesting interface coupled between them, it is expedient for the equivalent input impedance of the energy harvesting interface to be such as to enable the maximum transfer of energy (impedance matching). In energy harvesting system of a known type this is not always possible in so far as said systems are programmed for working in predefined operating conditions and hence do not adapt to the variation of said operating conditions.

There is accordingly a need in the art to provide an energy harvesting interface with impedance matching, a method for impedance matching of the energy harvesting interface, a system for harvesting environmental energy that uses the energy harvesting interface, that will enable the aforementioned problems and disadvantages for being overcome.

SUMMARY

According to the present invention, an energy harvesting interface with impedance matching, a method for impedance matching of the energy harvesting interface, and a system for harvesting environmental energy that uses the energy harvesting interface are provided as defined in the annexed claims.

BRIEF DESCRIPTION OF THE DRAWINGS

For a better understanding of the present invention, preferred embodiments thereof are now described, purely by way of non-limiting example and with reference to the attached drawings, wherein:

FIG. 3B is subject during use;

DETAILED DESCRIPTION

Figure 1:
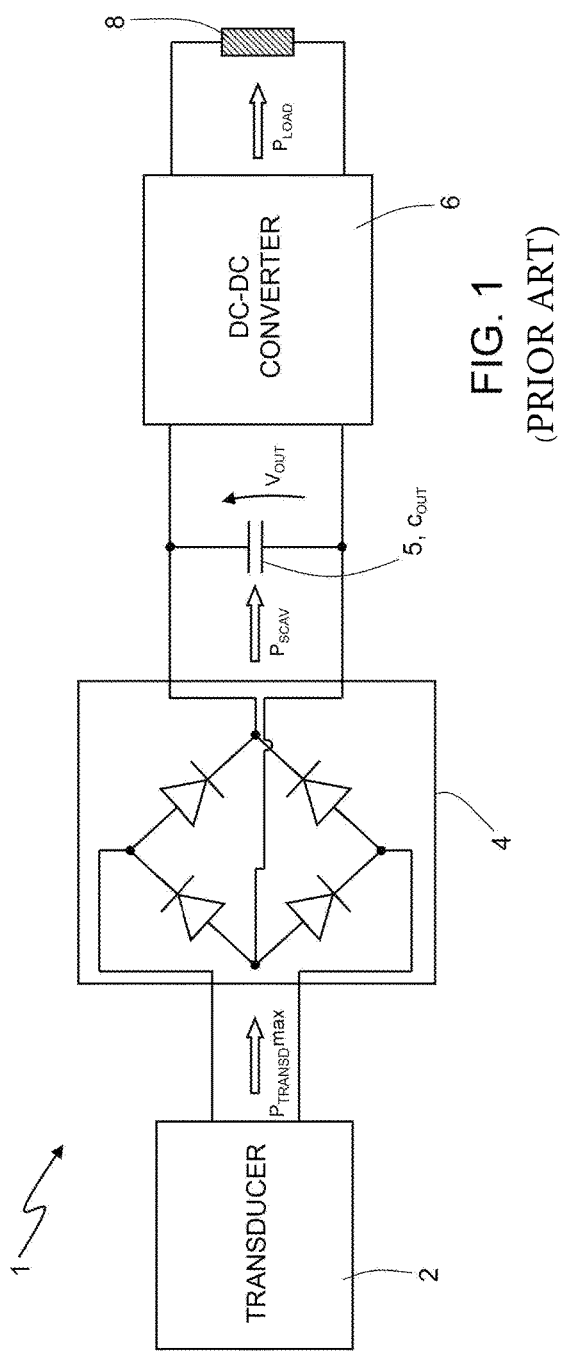
FIG. 1 shows an energy harvesting system according to a known embodiment.

The energy harvesting interface (in particular, having the configuration of a rectifier circuit) may be connected between an input-signal source (in particular, a variable voltage signal) and an electrical load (with the optional interposition of a DC-DC converter configured to supply to the electrical load a voltage signal having a voltage level accepted by the electrical load). The energy harvesting interface comprises, according to one embodiment, a first switch and a second switch, set in series with respect to one another, connected between an input terminal of the interface and a reference terminal of the interface, set at constant voltage (e.g., ground voltage, in particular 0 V). The interface further comprises a third switch and a fourth switch, set in series with respect to one another, connected between an input terminal of the interface and the reference terminal of the interface on which the energy is harvested. The energy harvesting interface further comprises control logic, coupled to the control terminals of the first and second switches, configured to open/close the first and second switches by an appropriate control signal.

The energy harvesting interface further comprises, as has been said, additional, third and fourth, switches, each having a control terminal. In use, for a polarity of the transduced input signal, the third and fourth switches are kept closed and are used during steps of detection of the current that flows through them, by the control logic. These detection steps define passage from a condition of storage of energy harvested by the transducer (exploiting the inductor integrated in the transducer itself) to a condition of transfer of said energy at output, for example to a storage capacitor and/or to an electrical load.

The storage capacitor is coupled to the output of the energy harvesting interface. The electrical load may be coupled in parallel to the storage capacitor, said electrical load being supplied by the energy stored in the capacitor.

As has already been said, a DC-DC converter, of buck, or boost, or buck/boost type may be optionally set between the capacitor and the electrical load.

In a first operating condition, and for a first polarity of the transduced voltage, the first and second switches are closed and the energy harvesting interface stores electrical energy; the diode guarantees that during this operating condition the energy will not flow to the storage capacitor.

In a second operating condition, and for the first polarity of the transduced voltage, the first switch is opened and the second switch is kept closed; the capacitor is charged by the electrical energy previously stored during the first operating condition and transferred through the diode. In the aforementioned first and second operating conditions, the third and fourth switches are kept closed (i.e., ON).

Passage from the first operating condition to the second operating condition, and vice versa, is cyclic. When the transduced voltage has a second polarity opposite to the first polarity (e.g., the first polarity is positive, and the second polarity is negative), the above operations are carried out in a similar way by appropriately controlling the third and fourth switches and keeping the first and second switches closed (ON).

The temporal duration of the first and second operating conditions is calculated by appropriate blocks for detecting the current that flows between the inputs of the energy harvesting interface and the reference terminal. These values are then supplied to the control logic that controls the switches according to one aspect of the present invention.

The energy harvesting interface according to the present invention is described in detail with reference to an application thereof, in particular as rectifier circuit of an energy harvesting system set between a voltage source (transducer) and an electrical load (or storage element).

Figure 14:
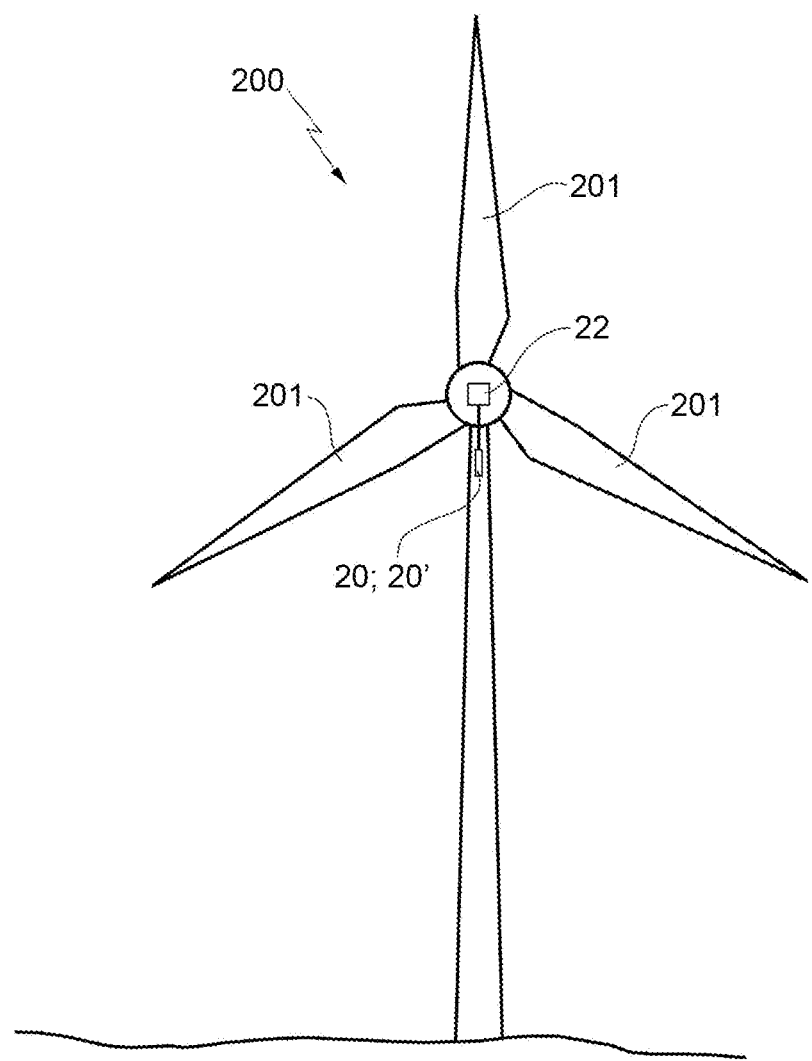
FIG. 14 shows a wind generator (turbine) implementation.

In particular, according an aspect of the present disclosure, the input impedance of the energy harvesting interface is regulated in such a way that the transducer "sees" an impedance such as to enable the maximum transfer of power to the electrical load. By way of example, in the case of a transducer of a wind-power type (see, for example, FIG. 14 with wind generator 200 include blades 201 which cause actuation of an energy harvesting system 20 including a transducer 22), in which the transduced electrical signal is a function of the wind speed, the input impedance of the harvesting interface varies as a function of the wind speed.

Figure 3A:
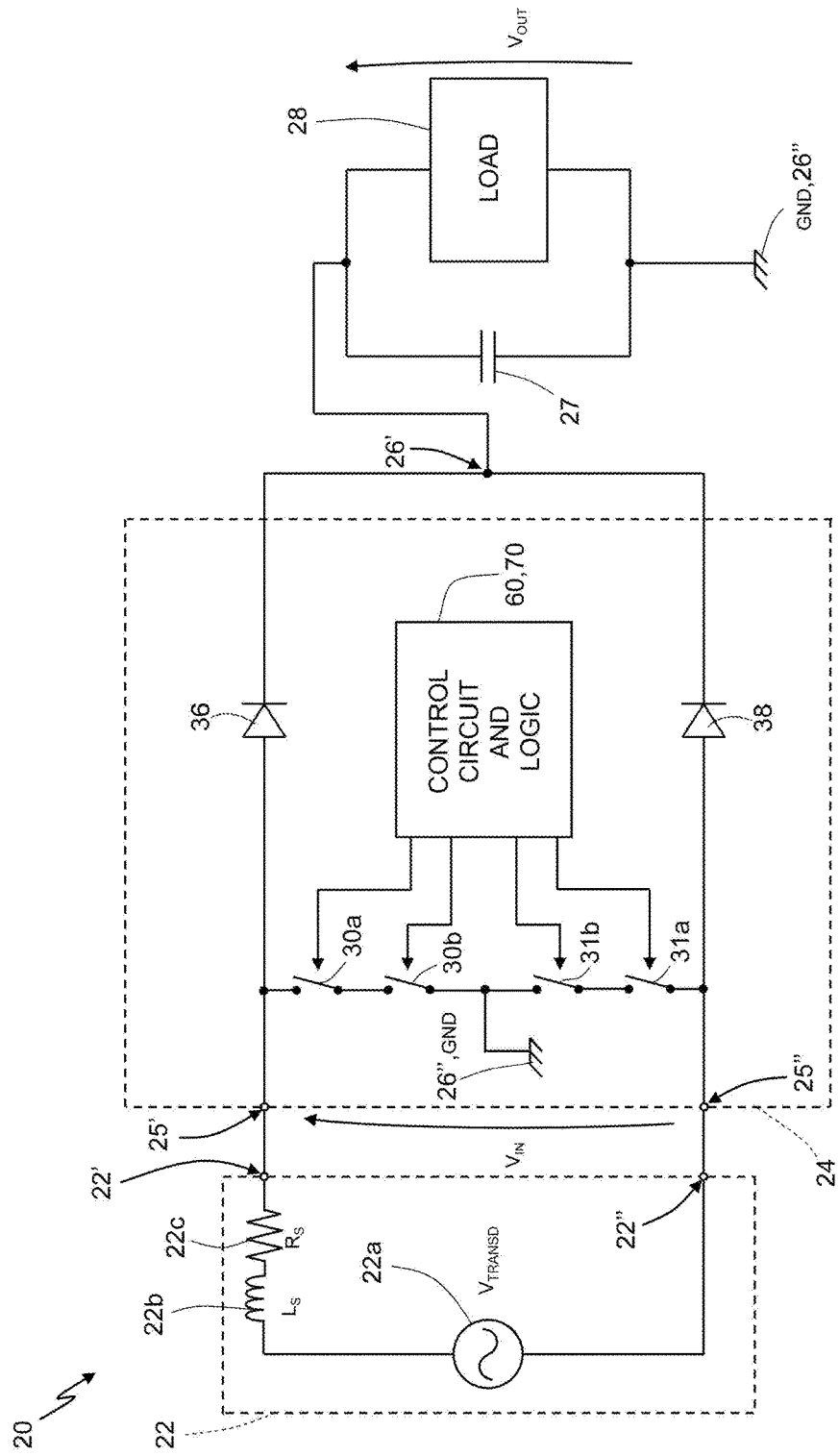
FIGS. 3A and 3B show an energy harvesting system comprising a circuit of an energy harvesting interface that may operate according to the steps of the method of FIG. 11, according to respective embodiments.

FIG. 3A shows an energy harvesting system 20 comprising a rectifier circuit 24, according to one embodiment.

In general, the energy harvesting system 20 comprises: a transducer 22 (similar to the transducer 2 of FIG. 1) including its own output terminals 22', 22"; the rectifier circuit 24, including a first input terminal 25' and a second input terminal 25", electrically coupled, respectively, to the output terminals 22', 22" of the transducer 22, a first output terminal 26', and a reference terminal 26"; and a storage element 27, for example a capacitor, connected between the first output terminal 26' and the reference terminal 26" of the rectifier circuit 24, and configured to store electrical charge supplied at output from the rectifier circuit 24. According to one embodiment, the reference terminal 26" is a ground-voltage reference terminal GND, for example equal to approximately 0 V. Other reference voltages may be used.

The transducer 22 is, for example, an electromagnetic transducer, and is represented schematically for including a voltage generator 22a, configured to supply a voltage $V_{TRANSD}$, an inductor 22b (typical of the electromagnetic transducer) having an inductance $L_S$, and a resistor 22c having a resistance $R_S$, connected in series to the inductor 22b.

On the output of the rectifier circuit 24, in parallel with the storage element 27, there may be connected an electrical load 28, configured to be supplied by the charge stored in the storage element 27 or by means, for example, of a DC-DC converter (not illustrated in the figures) in the case where the electrical load requires a voltage value different from the voltage generated at output from the rectifier circuit 24.

Connected in series together between the first input terminal 25' and the reference terminal 26" of the rectifier circuit 24 are a high-voltage (HV) switch 30a and a low-voltage (LV) switch 30b, in particular of the voltage-controlled type. The switches 30a and 30b are, for example, N-channel field-effect transistors (FETs).

The HV switch 30a is a device that is able to withstand high voltages. According to one embodiment, the HV switch 30a is a DMOS transistor configured to operate with gate-to-drain voltages ($V_{GD}$) and drain-to-source voltages ($V_{DS}$) ranging between 30 and 50 V, for example 40 V.

In addition to DMOSs, it is likewise possible to use drift MOSs and drain extension MOSs, which are transistors that may withstand high voltages between drain and source terminals, and between gate and drain terminals. It may be noted that the range of voltages indicated is purely indicative and non-limiting. Technologies configured to withstand voltages higher than 50 V are known and under development, and may likewise be used in the context of the present invention.

The LV switch 30b is a low-voltage device. According to one embodiment, the LV switch 30b is a CMOS transistor configured to operate with gate-to-source voltages ($V_{GS}$) ranging, for example, between 1 and 5 V, in particular 2.5-3.6 V, for example 3.3 V. Other technologies for low-voltage transistors envisage slightly higher operating voltages, for example in the region of 4-5 V.

It is evident that the values appearing indicate a possible embodiment, and vary according to the technology used for the transistors and to the specific application of the present invention.

The first input terminal 25' is electrically coupled to the first output terminal 26' by a diode 36. The diode 36 is chosen for having a low forward threshold voltage, in the region of 0.6-0.7 V, for maximizing the efficiency of the rectifier, above all in the steps where the voltage stored on the output capacitor is low.

According to an alternative embodiment (not illustrated), the diode 36 may be replaced by a MOSFET, for example, of the N-channel type. As is known, a MOSFET has an internal diode (parasitic diode). In this case, the MOSFET may be operated in an active way (by actively controlling turning-on and turning-off of the MOSFET), or in a passive way (by turning off the MOSFET and exploiting the internal parasitic diode).

Furthermore, the rectifier circuit 24 comprises a further HV switch 31a and a further LV switch 31b, connected together in series and electrically coupled between the second input terminal 25" and the reference terminal 26" of the rectifier circuit 24. The switches 31a and 31b are similar to the switches 30a and 30b, and such that the HV switch 31a is a device that is able to withstand high gate-to-drain voltages and drain-to-source voltages (for example 30-50 V, in particular 40 V), whereas the LV switch 31b is a low-voltage device, for example a CMOS, which is able to withstand low gate-to-source voltages (for example, 1-5 V, in particular 2.5-3.6V, even more in particular 3.3 V). Other technologies for low-voltage transistors envisage slightly higher operating voltages, for example in the region of 4-5 V.

The second input terminal 25" is electrically coupled to the first output terminal 26' by a diode 38, similar to the diode 36. According to an alternative embodiment (not illustrated), the diode 38 may be replaced by a MOSFET, for example an N-channel MOSFET. As is known, a MOSFET has an internal diode (parasitic diode). In this case, said MOSFET may be operated in a active way (by actively controlling turning-on and turning-off of the MOSFET), or in a passive way (by turning off the MOSFET and exploiting the internal parasitic diode).

For simplicity of description, the HV switches 30a and 31a will hereinafter be referred to, respectively, as "high-voltage (HV) transistors 30a and 31a", without this implying any loss of generality, and the LV switches 30b and 31b be referred to, respectively, as "low-voltage (LV) transistors 30b and 31b", without this implying any loss of generality.

Likewise, the terms "transistor closed" or "transistor ON" will hereinafter refer to a transistor biased so to enable conduction of electric current between its source and drain terminals, i.e., configured to behave as a closed switch, and the terms "transistor open" or "transistor OFF" will hereinafter refer to a transistor biased so not to enable conduction of electric current between its source and drain terminals, i.e., configured to behave ideally as an open or inhibited switch.

Figure 3B:
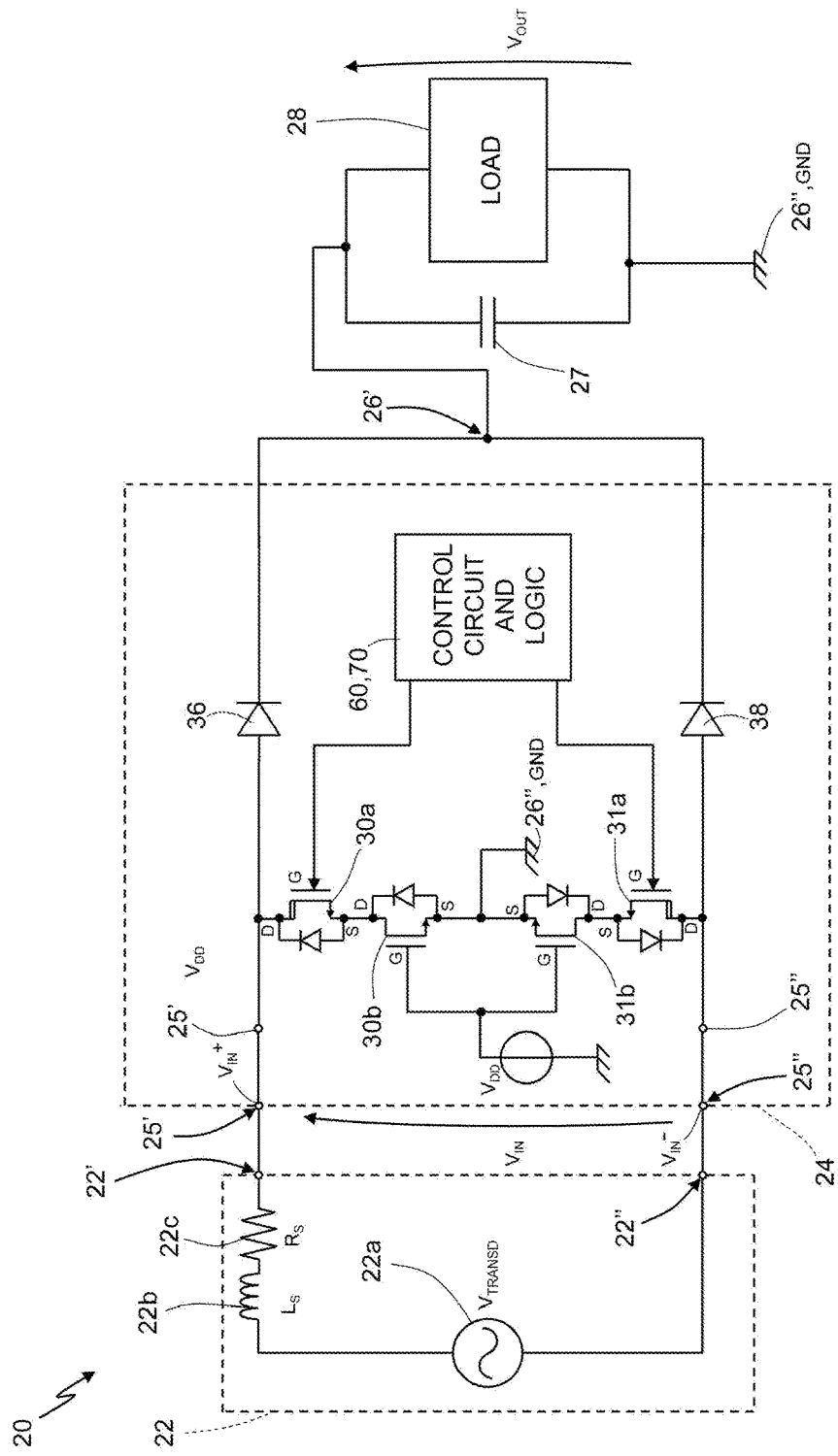

FIG. 3B shows the energy harvesting system 20 of FIG. 3A, where the switches have been replaced by respective transistors. Each transistor is further represented with its own internal diode (parasitic diode).

With reference to FIG. 3B, the drain terminal D of the HV transistor 30a is connected to the first input terminal 25' of the rectifier circuit 24, whereas the source terminal S of the HV transistor 30a is connected to the drain terminal D of the LV transistor 30b; the source terminal S of the LV transistor 30b is instead connected to the reference terminal 26". The diode 36 has its cathode electrically coupled to the output terminal 26' of the rectifier circuit 24 and its anode electrically coupled to the first input terminal 25' of the rectifier circuit 24.

As regards the HV transistor 31a and LV transistor 31b, these are connected between the second input terminal 25" and the reference terminal 26" of the rectifier circuit 24 so that the source terminal S of the LV transistor 31b is connected to the reference terminal 26", the drain terminal D of the HV transistor 31a is connected to the second input terminal 25", and the remaining drain terminal D of the LV transistor 31b and source terminal S of the HV transistor 31a are connected together.

The diode 38 has its cathode electrically coupled to the output terminal 26' of the rectifier circuit 24 and its anode electrically coupled to the second input terminal 25" of the rectifier circuit 24. During positive half-cycles of the input voltage $V_{IN}$, the voltage is rectified by appropriately driving the HV transistor 30a, keeping the transistors 30b, 31a, 31b in the ON state. Instead, during negative half-cycles of the input voltage $V_{IN}$, the voltage is rectified by appropriately driving the HV transistor 31a, keeping the transistors 31b, 30a, 30b in the ON state.

According to one embodiment, the rectifier circuit 24 further comprises a control circuit and a control logic, designated in FIG. 3A or FIG. 3B by the reference numbers 60 and 70, and better described with reference to FIGS. 8 and 9. Furthermore, the control logic 60 implements the steps of the method of FIG. 11.

Figure 4A:
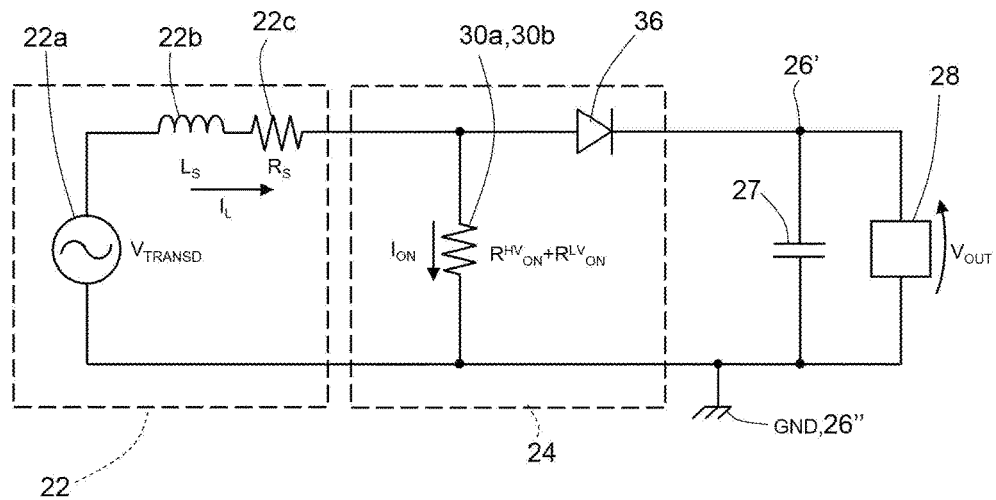
FIGS. 4a and 4B show the energy harvesting system of FIG. 3A or 3b in respective operating conditions, following one another in time.

In use, for example for positive values of the voltage $V_{IN}$, the HV transistor 30a and the LV transistor 30b are kept ON for at least a time interval $T_{DELAY}$ for storing energy in the inductor 22b (situation illustrated schematically in FIG. 4A). During this step, storage of the energy in the inductor 22b is guaranteed by the fact that the diode 36 does not conduct. Furthermore, also the transistors 31a and 31b are kept in the ON state.

Then, when the time interval $T_{DELAY}$ has elapsed and the energy stored (current flowing) in the inductor 22b has reached a minimum threshold value $I_{TH}$, the HV transistor 30a is turned off. A current may thus flow from the inductor 22b, through the diode 36, to the storage element 27/electrical load 28. This situation is illustrated schematically in FIG. 4B.

Figure 4B:
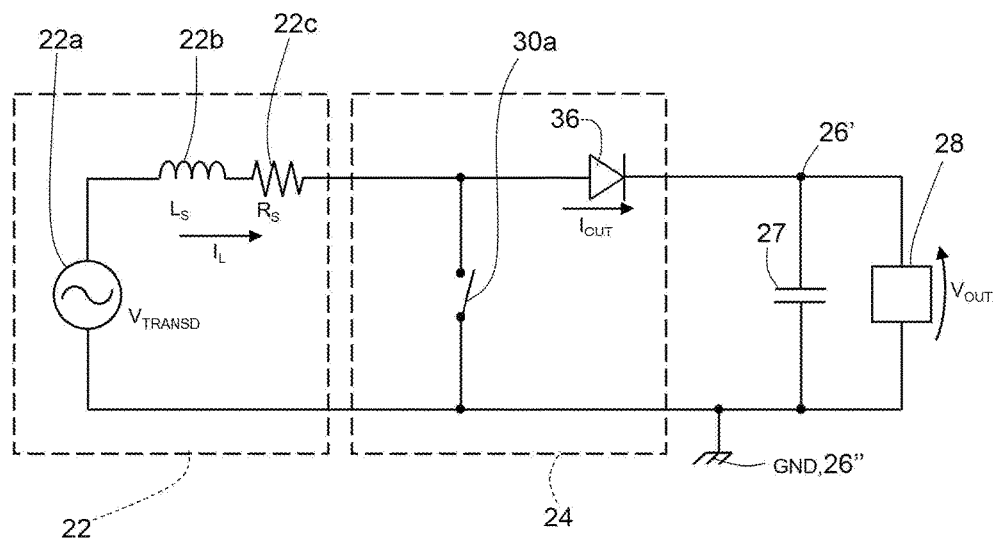

As has been said, the input signal $V_{IN}$ is a variable signal, i.e., having a polarity that varies in time. For negative polarities of $V_{IN}$, what has been described with reference to FIGS. 4A and 4B is in any case valid by controlling in a similar way the transistors 31a and 31b. The steps of control of these transistors are not herein described for brevity, but are apparent to the person skilled in the branch on the basis of what has so far been described.

According to one embodiment of the present invention, in both of the operating conditions of FIGS. 4A and 4B, for positive polarities of the input voltage $V_{IN}$, the LV transistor 30b is always kept closed, and the control logic 60 drives just the HV transistor 30a into the open/closed state. Likewise, for negative polarities of the input voltage $V_{IN}$, the control logic 60 drives just the HV transistor 31a into the open/closed state, whereas the LV transistor 31b is always kept closed. This situation is schematically represented in FIG. 3B, which shows a voltage generator, configured to generate a voltage $V_{DD}$, coupled to the control terminals G of the LV transistors 30b and 31b. The voltage $V_{DD}$ is chosen with a value such as to drive the LV transistors 30b and 31b into the closed state.

During the step of FIG. 4B, where the current stored in the inductor 22b is transferred at output on the storage element 27 by the diode 36 (or alternatively the diode 38, according to the polarity of the input voltage $V_{IN}$), an increase in the output voltage $V_{OUT}$ is noted.

Hereinafter, operation of the rectifier 24 is described more fully with reference to a circuit model valid for one polarity (in particular, the positive polarity) of the input signal $V_{IN}$, for greater simplicity and clarity of description. As has been said, what has been described may in any case be readily applicable to control of the transistors 31a and 31b, in the case of negative polarity of the input signal $V_{IN}$.

FIG. 4A shows a circuit equivalent to the circuit of FIG. 3A or FIG. 3B, for positive half-waves of the input voltage $V_{IN}$. The diode 36, in this condition, does not conduct. The transistors 30a and 30b are ON. In this operating condition, the transistors 30a and 30b are ideally replaced by respective resistors which have a resistance $R^{HV}_{ON}$ and, respectively, $R^{LV}_{ON}$ (ON-state resistance of the transistors 30a and 30b).

The current $I_L$ that flows in the inductor 22b is equal to the current $I_{ON}$ that traverses the transistors 30a and 30b in the ON state. The value of the current $I_L$ increases until it reaches a maximum, or peak, value $I_p$ (see the graph of FIG. 5A).

The current $I_{ON}$ reaches the peak value $I_p$ at time $t=t_c=T_{DELAY}$. For simplicity, it is assumed that the starting instant $t_0$ is 0 µs.

Once the time interval $T_{DELAY}$ has elapsed and assuming that the current $I_L$ that flows in the inductor 22b has reached a value equal to, or higher than, the threshold value $I_{TH}$, the operating condition represented schematically in FIG. 4B is reached.

The time interval $T_{DELAY}$ is the interval between the instant of closing of the HV transistor 30a (at time $t_0$) and the instant of opening of the HV transistor 30a (at time $t_c$).

With reference to FIG. 4B, at time $t_c$, the HV transistor 30a is opened, and the diode 36 starts to conduct. The current $I_L$ that flows from the inductor 22b to the output 26' of the rectifier 24 is the current $I_{OUT}$ that charges the capacitor 27. In this step, the current in the inductor 22b decreases with a constant slope, until it reaches the pre-defined value $I_{OFF}$ (at time $t_{max}$, see again FIG. 5A).

Figure 5A:
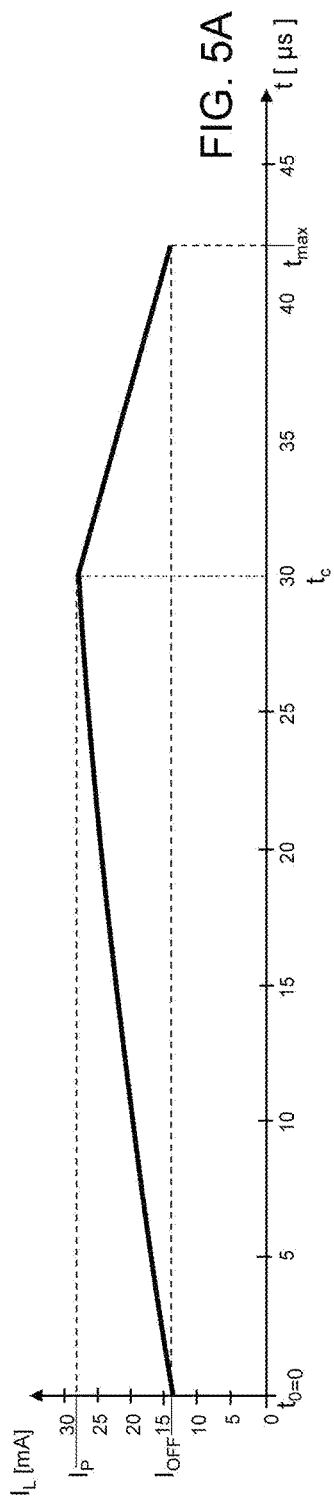
FIGS. 5A-5C show, using the same time scale, the time plot of current signals of the energy harvesting system of FIG. 3A or FIG. 3B in the operating conditions of FIGS. 4A and 4B.

$I_{OFF}$ is a constant value, given by $I_p/K$, where K is a constant higher than 1 (chosen as explained hereinafter). FIG. 5A shows the plot of the current $I_L$ at time t (in microseconds). The curve of the current $I_L$ reaches the peak value $I_p$ at the instant $t_c$, where the HV transistor 30a is opened (see FIG. 5B).

Then, between $t_c$ and $t_{max}$ (time interval $T_{CHARGE}$) the current $I_L$ decreases until it reaches the value $I_{OFF}=I_p/K$.

Figure 5B:
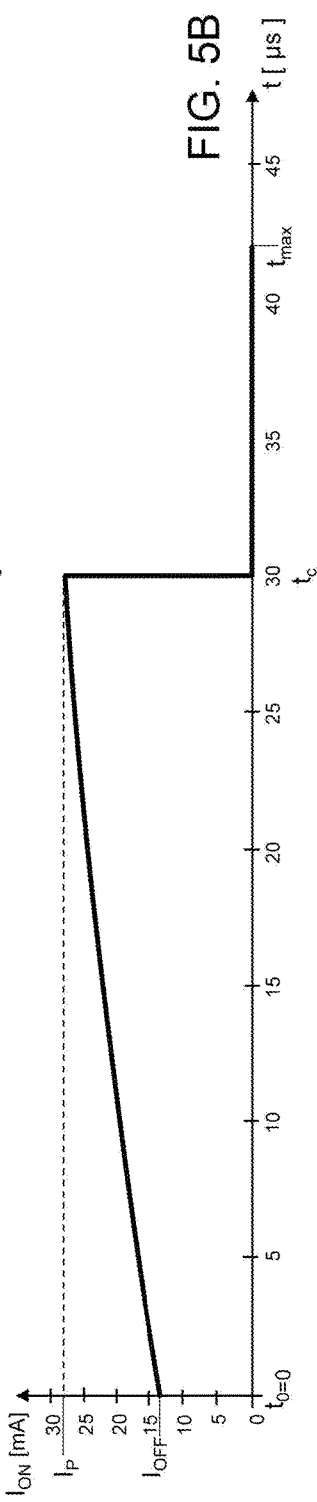

FIG. 5B shows, using the same time scale as that of FIG. 5A, the plot of the current $I_{ON}$ that flows through the HV transistor 30a during the step of FIG. 4A of charging of the inductor 22b. In the time interval $t_0$-$t_c$, the current $I_{ON}$ follows the same plot as that of the current $I_L$; at the instant $t_c$, the HV transistor 30a is opened and consequently the current $I_{ON}$ drops to zero.

Figure 5C:
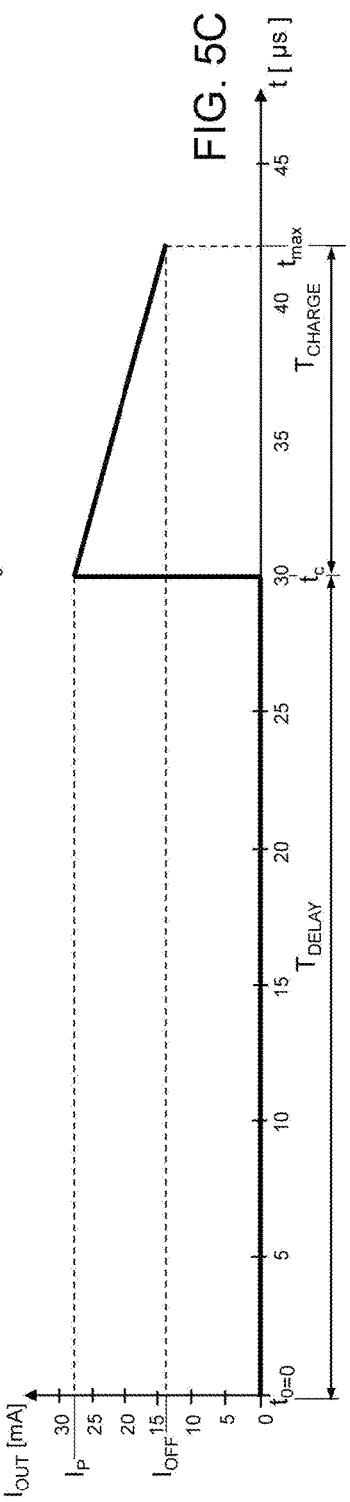

FIG. 5C shows, using the same time scale as that of FIGS. 5A and 5B, the plot of the output current $I_{OUT}$. The current $I_{OUT}$ remains at a zero value in the time interval $t_0$-$t_c$, to reach the peak value $I_p$ at the instant $t_c$ in which the capacitor 27 is electrically coupled to the inductor 22b. Then, between $t_c$ and $t_{max}$ (within the time interval $T_{CHARGE}$), the energy stored in the inductor 22b supplies and charges the capacitor 27.

At time $t_{max}$, when the current that flows to the capacitor 27 reaches the threshold value $I_{OFF}$, the HV transistor 30a is closed so that the inductor 22b charges again, as has already been described. The steps of charge and discharge of the inductor 22b (and, consequently, of supply of the capacitor 27/load 28) repeat in a cyclic way.

The integral of the curve of $I_{OUT}$ (FIG. 5C) between time $t_c$ and time $t_{max}$ indicates the charge $Q_{CYCLE}$ transferred between the input and the output of the rectifier 24 in the time interval $T_{CHARGE}$. In order to maximize the efficiency of transfer of charge between the input and the output of the rectifier 24, it is expedient to maximize the value of the power $P_{CYCLE}$ transferred at output from the rectifier circuit 24 in each cycle of charge/discharge of the inductor 22b. The power $P_{CYCLE}$ is defined as $P_{CYCLE}=V_{OUT} \cdot I_{CYCLE}$, where $I_{CYCLE}$ is given by $I_{CYCLE}=Q_{CYCLE}/T_{CYCLE}$, where $T_{CYCLE}$ is the time interval between $t_0$ and $t_{max}$ ($T_{CYCLE}=T_{DELAY}+T_{CHARGE}$).

The present applicant has found that $P_{CYCLE}$ is given by the following relation (where $I_{ON}$ assumes the peak value $I_p$)

$$P_{CYCLE} = \frac{\frac{I_{ON}+I_{OFF}}{2} \cdot T_{CHARGE}}{T_{DELAY}+T_{CHARGE}} \cdot V_{OUT}$$

From the foregoing relation it may be noted how the power $P_{CYCLE}$ is a function of the parameters $T_{DELAY}$ and K (given that $T_{CHARGE}$ is a function of K), and of the external variables $V_{TRANSD}$ (voltage of the transducer) and $V_{OUT}$ (voltage across the capacitor 27). Since the voltage $V_{TRANSD}$ is not a parameter that may be controlled beforehand, but may only be measured instant per instant, as likewise the voltage $V_{OUT}$, maximizing the value of $P_{CYCLE}$ thus means finding the optimal values of $T_{DELAY}$ and K such that the curve of $P_{CYCLE}$ reaches a maximum value, or a value close to the maximum, or an optimal value definable according to the particular application and design requirements.

The values of the time interval $T_{DELAY}$ and of the factor K make it possible to set the input impedance of the energy harvesting interface and to obtain an optimal value of impedance as the value of the environmental stimulus on the basis of which the voltage $V_{TRANSD}$ is generated varies. In order to increase the values of coupling efficiency $\eta_{COUPLE}$, in particular to keep values of efficiency equal to or higher than 95%, it is expedient to monitor the value of the environmental stimulus and set the values of $T_{DELAY}$ and K as a function of the measured value. This is particularly important in applications where the environmental stimulus to which the transducer is subject varies considerably, causing a consequent variation of the signal transduced $V_{TRANSD}$ and, consequently, a possible reduction of coupling efficiency.

To achieve the aforesaid purpose it is expedient to define, for example by means of databases stored in a memory of the control logic 60, a unique association between the values that the environmental stimulus, to which the transducer 22 is subject in use, may assume and a measured value of input resistance of the interface, and a further unique association between a value of input resistance and a respective pair of values of the variables $T_{DELAY}$ and K. In fact, the present applicant has found that the transfer of energy made by the transducer 22 is a function of the environmental stimulus and of the impedance coupled to the output terminals of the transducer 22. In other words, to maintain the maximum transfer of energy as the environmental stimulus varies, also the impedance coupled to the output of the transducer 22 must vary accordingly.

To obtain the foregoing, it is expedient to characterize beforehand the transducer 22 used. This operation may easily be carried out for a variety of transducers, for example wind transducers, solar transducers, vibration transducers, thermal transducers, etc.

In the first place, the output of the transducer is connected to a resistive test load with variable resistance.

Then, the transducer is subjected to an environmental stimulus (for example, in the case of a wind transducer, the transducer is set in a wind tunnel). By keeping the environmental stimulus fixed, the power transferred at output on the resistive test load is measured for a plurality of discrete values of resistance of the resistive test load. In this way, a plurality of associations are obtained between a value of environmental stimulus, values of load resistance, and power transferred at output on the resistive test load. The value of interest is, obviously, the value of load resistance for which there is the maximum power transfer.

The next step is to vary the value of the environmental stimulus in discrete steps, for a plurality of values in a predefined operating range. For instance, in the case of a wind transducer, the speed of the wind is made to vary. For each discrete value of the environmental stimulus the procedure is as described previously; i.e., the value of resistance of the resistive test load is made to vary in order to identify at what value of load resistance there is the maximum transfer of power at output.

It is thus possible to generate a database in which associated to each value of environmental stimulus is a value of optimal load resistance such that the transducer is able to maximize the transfer of power transduced at output.

Since by varying the values of the time interval $T_{DELAY}$ and of the factor K, the value of electrical resistance that the rectifier circuit 24 presents to the transducer 22 is varied, it is possible to generate an association between a pair of values $T_{DELAY}$, K and a value of input resistance presented by the rectifier circuit 24 to the transducer 22. For this purpose, the procedure is as described in what follows.

The input terminals 25', 25" of the rectifier circuit 24 (to which the electrical load 27, 28 is coupled) are connected to a test-voltage generator module that constitutes an equivalent model of a voltage transducer (for example, a model that includes a voltage generator with a resistor and an inductor set in series).

Via the control logic 60, a first value of the parameter $T_{DELAY}$ and a respective first value of the parameter K are set. Then, a first voltage is supplied between the input terminals 25' and 25" of the rectifier circuit 24, and the value of electrical resistance at the input terminals 25' and 25" is measured and stored.

Figure 2:
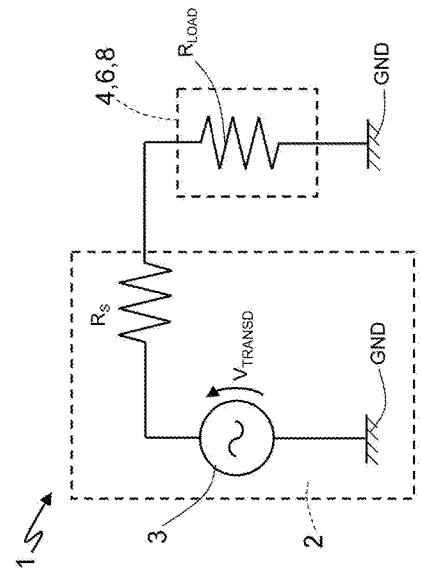
FIG. 2 shows a circuit equivalent to the energy harvesting system of FIG. 1.

Following the electrical diagram of FIG. 2, from the voltage $V_{TRANSD}$ (which is known) emulated by the test-voltage generator, the series resistance $R_S$ (which is known, in so far as it is the series resistance of the generator or the series resistance external to the generator itself), and the current $i_{TEST}$ supplied by the test-voltage generator (which is known), it is possible to derive immediately the resistance at the input terminals 25' and 25" as $R_{IN}=(V_{TRANSD}-R_S \cdot i_{TEST})/i_{TEST}$. In this case, $V_{TRANSD}$ and $i_{TEST}$ are mean values, calculated on a predefined time interval, for example chosen as being of an order of magnitude greater than the order of magnitude of the intervals $T_{DELAY}$ considered.

Next, the value of just the parameter K is varied, and the new value of electrical resistance at the input terminals 25' and 25" is measured and stored. The same procedure is followed for all the values envisaged for the parameter K.

Then, the value of just the parameter $T_{DELAY}$ is varied, and the value of electrical resistance at the input terminals 25' and 25" obtained for each possible pair of the values $T_{DELAY}$ and K is measured and stored.

In this way, it is possible to associate uniquely, for example in a database, a specific value of resistance present at the input terminals 25' and 25" to a pair of values $T_{DELAY}$, K.

During use of the energy harvesting interface according to the present disclosure, it is hence possible to measure a current value of input resistance of the energy harvesting interface and associate to said measured value a pair of values $T_{DELAY}$, K such that the transfer of energy from the transducer 22 to the rectifier circuit 24 is maximized.

For this purpose, the control logic 60 stores, in an internal memory, a database containing a plurality of possible values of the relevant environmental stimulus (wind speed in the case of a wind transducer, light intensity in the case of a solar transducer, intensity of vibration in the case of a vibration transducer, etc.) and a respective plurality of other values of input resistance, and an association between the latter and respective pairs of values $T_{DELAY}$, K, so that each pair $T_{DELAY}$, K is uniquely associated to one of the values of the environmental stimulus.

In use, the value of the environmental stimulus is measured and, on the basis of the values stored in the database, the energy harvesting interface is programmed with the corresponding values of $T_{DELAY}$ and K.

Measurement of the environmental stimulus may be made in various ways, for example by means of sensors external to the energy harvesting interface, which communicate with the control logic 60 for sending to the latter the information detected (e.g., wind speed).

Alternatively, the measurement of the environmental stimulus may be made indirectly by measuring, in use, the frequency of the transduced voltage signal $V_{TRANSD}$, i.e., the frequency of the voltage signal $V_{IN}$ at input to the rectifier circuit 24, and associating said measured frequency to a unique value of the environmental stimulus. In particular, this applies when resonant transducers are used, which generate a transduced signal having a specific resonance frequency depending upon a characteristic quantity of the environmental stimulus (for example, as a function of the wind speed in the case of a resonant wind transducer).

For this purpose, it is possible to modify the database stored in the memory of the control logic 60 in such a way that uniquely associated to each pair of values $T_{DELAY}$, K is a value of frequency of the transduced signal (which, as has been said, indicates a specific value of a respective quantity of the environmental stimulus). In this way, it is not necessary to have available a detector external to the energy harvesting interface for measuring the value of the environmental stimulus, but signals generated inside the harvesting interface itself are exclusively used (the interface is hence autonomous in its operation). Association between the value of the environmental stimulus and the frequency of the signal transduced may be easily obtained through experimental tests, for example by subjecting the transducer 22 to an environmental stimulus of a variable value and detecting, for each value assumed by the environmental stimulus, the corresponding value of frequency of the transduced signal. As has been said, in particular in the case of resonant transducers (which are known to the art), corresponding to each value of environmental stimulus is a unique value of resonance frequency (frequency of the transduced signal).

Figure 6:
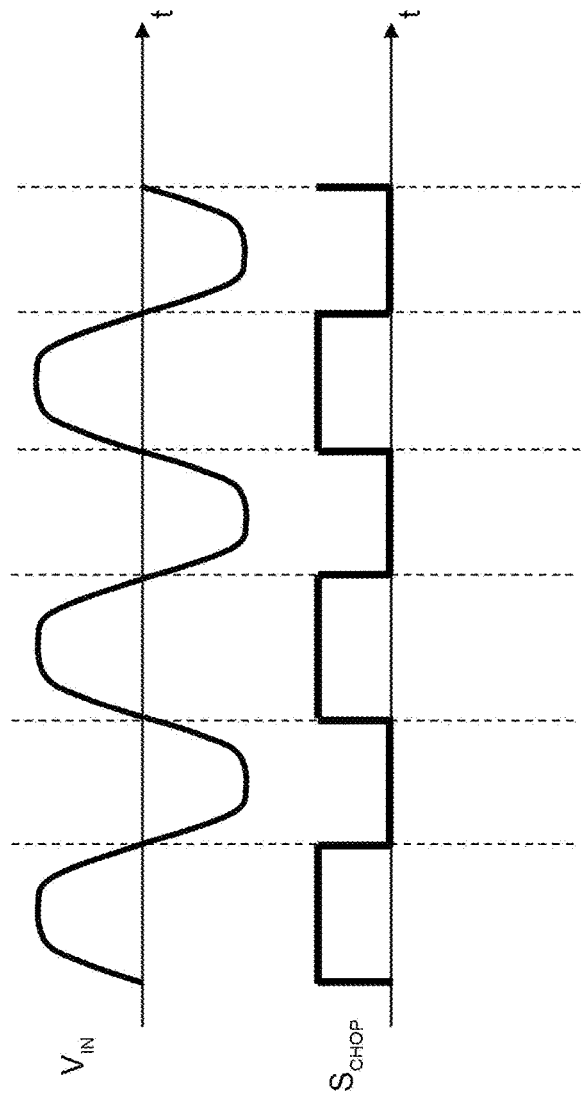
FIG. 6 shows the generation of a signal correlated to an environmental stimulus to which the energy harvesting system of FIG. 3A

FIG. 6 is a graphic representation of generation of a digital signal $S_{CHOP}$ identifying the frequency of the transduced signal $V_{TRANSD}$ ($V_{IN}$). The digital signal $S_{CHOP}$ is generated, for example, by means of an analog-to-digital converter coupled between the output terminals 22', 22" of the transducer 22, and supplied to the control logic 60, to be interpreted. A microcontroller, for example external to the energy harvesting interface, receives the digital signal $S_{CHOP}$, derives (in a way in itself known) the value of frequency of the digital signal $S_{CHOP}$, and sets the values of $T_{DELAY}$ and K that, in the database stored, are uniquely associated to the value of frequency of the digital signal $S_{CHOP}$.

The operation of acquisition of the digital signal $S_{CHOP}$ and/or the operation of detection of the frequency of the digital signal $S_{CHOP}$ may be carried out at regular intervals or in a continuous way, so that the values are modified whenever the value of the environmental stimulus changes. In order to prevent continuous updating of the values of $T_{DELAY}$ and K for minimal variations of the values of the environmental stimulus, it is possible to introduce a threshold, for example such that the values of $T_{DELAY}$ and K are updated when the frequency of the digital signal $S_{CHOP}$ varies significantly with respect to the previous value. A significant variation is, for example, 5% to 10% of the frequency value.

Figure 7:
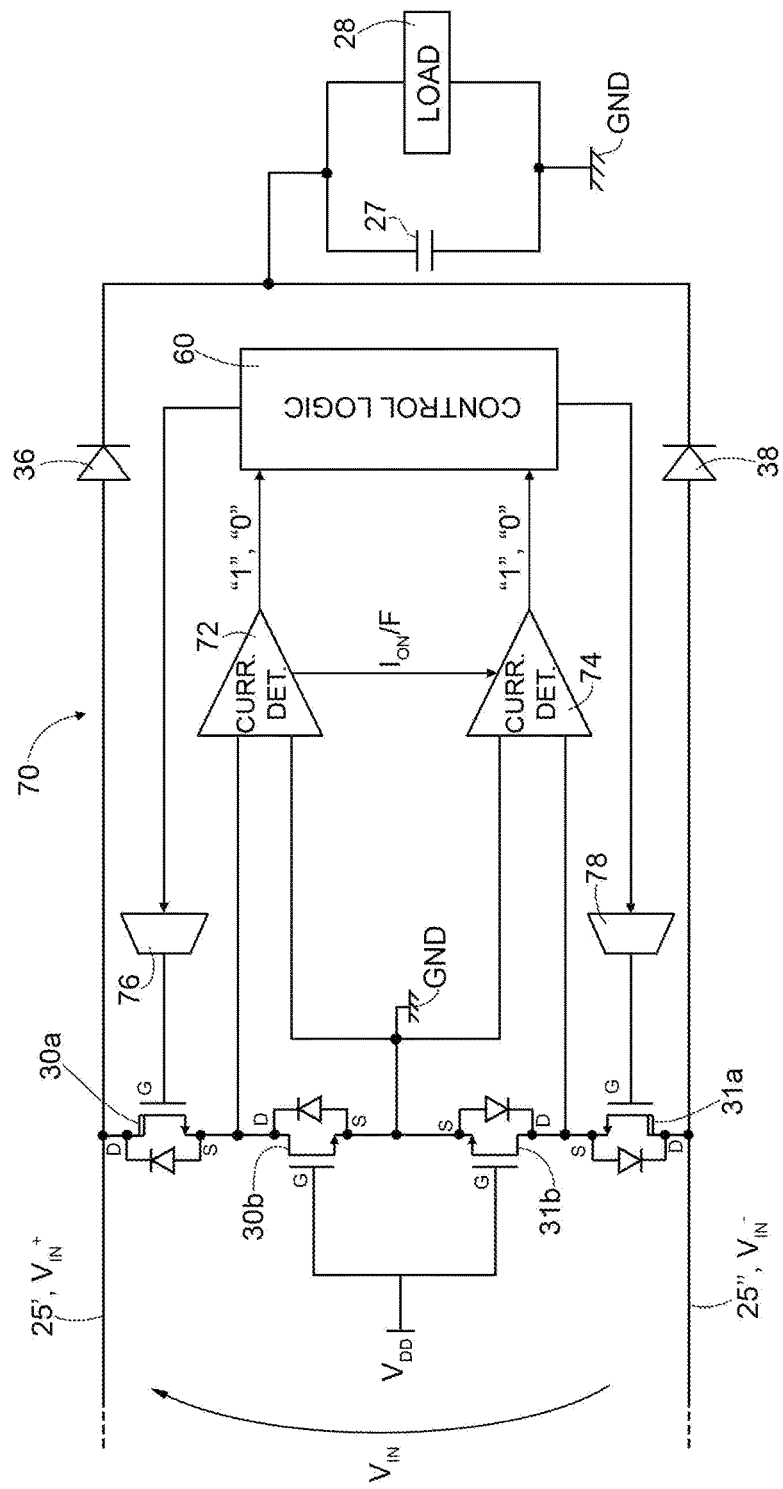
FIG. 7 shows the energy harvesting system of FIG. 3A or FIG. 3B in greater detail, according to one embodiment.

FIG. 7 shows, by functional blocks, a control circuit 70 for driving the HV transistor 30a in order to implement the operating conditions of FIGS. 4A and 4B. The control circuit 70 operates, in particular, for positive half-waves ($V_{IN}^+$) of the input signal $V_{IN}$. The LV transistors 30b and 31b are biased at constant voltage $V_{DD}$, for being kept always in the ON state. The value of the voltage $V_{DD}$ is thus chosen on the basis of the characteristics of these transistors, with the purpose of driving them into the ON state.

Figure 10:
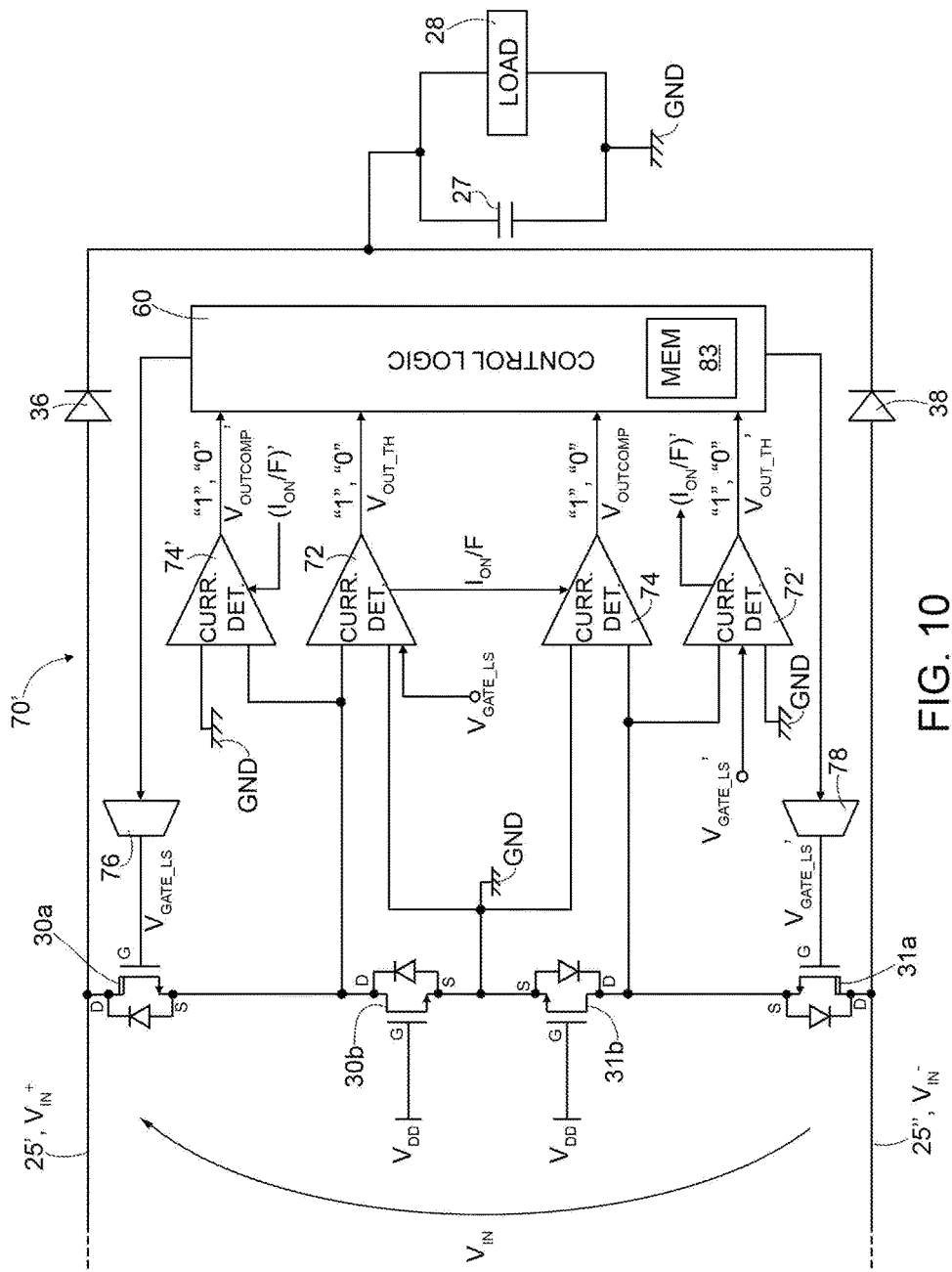
FIG. 10 shows the energy harvesting system of FIG. 3A or FIG. 3B in greater detail, according to a further embodiment.

In order to drive the HV transistor 31a for negative half-waves of the input signal $V_{IN}$, a circuit architecture is used similar to the one illustrated for the control circuit 70 (see, for example, FIG. 10).

In greater detail, the control circuit 70 comprises a first current detector 72, coupled between the source terminal S and the drain terminal D of the LV transistor 30b, for detecting (during the step of FIG. 4A) the instant in which the current $I_{ON}$ that flows through the LV transistor 30b (and, consequently, also through the HV transistor 30a) exceeds the threshold $I_{TH}$. When this condition is detected, and the interval $T_{DELAY}$ has elapsed, the control logic 60 drives the HV transistor 30a into inhibition, thus controlling passage to the operating condition of FIG. 4B. In addition, the current detector 72 participates in generation, in the step of FIG. 4A, of a scaled copy $I_{ON}/K$ of the current that flows in the LV transistor 30b, as illustrated more clearly hereinafter.

Figure 8:
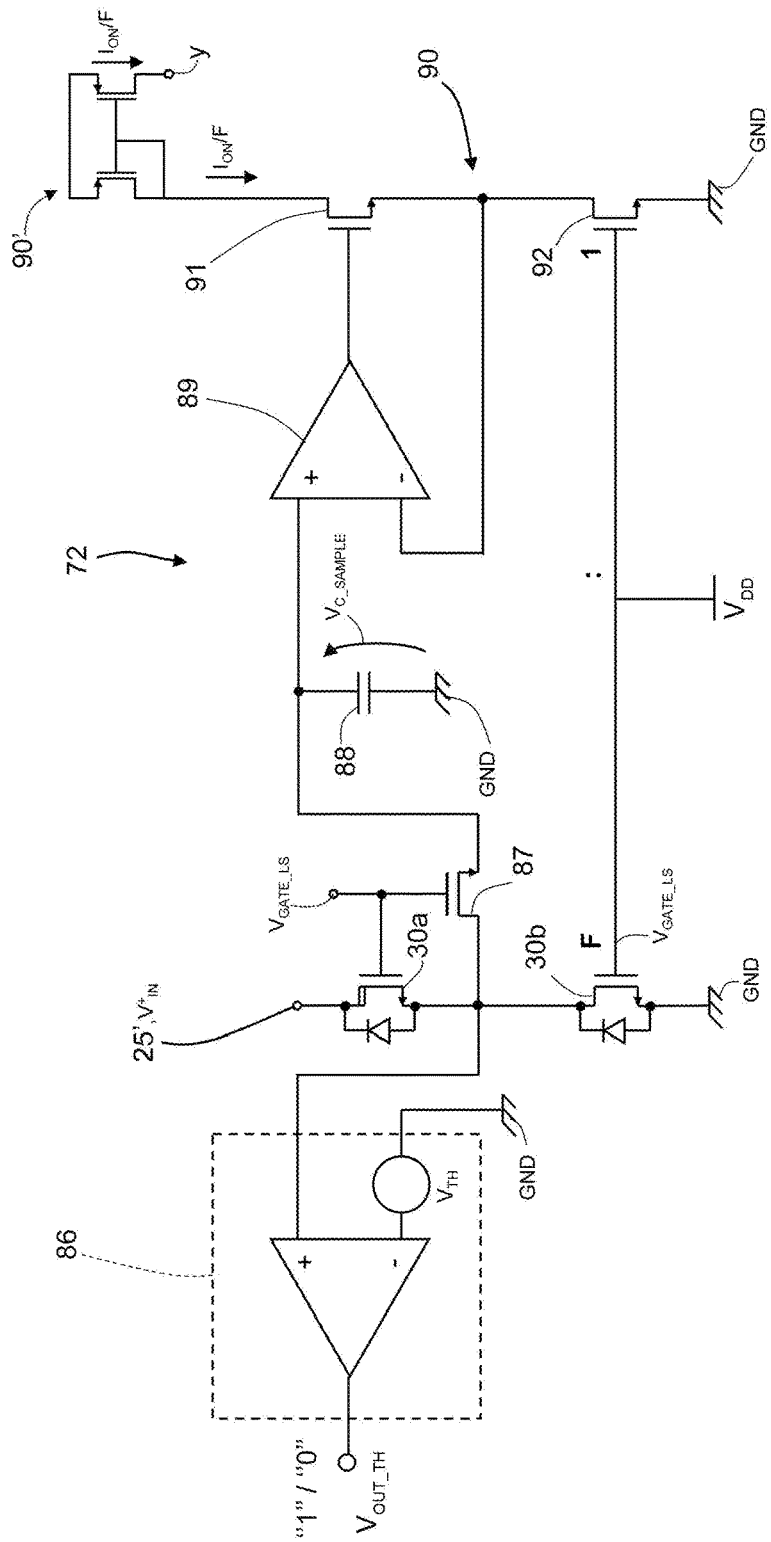
FIG. 8 shows a current detector used in the energy harvesting system of FIG. 7.

FIG. 8 shows in greater detail the first current detector 72, according to one embodiment. With reference to FIG. 8, a first portion of the current detector 72 comprises a comparator 86 configured to receive at input, on its non-inverting terminal, the voltage signal present on the source terminal S of the HV transistor 30a (or likewise on the drain terminal of the LV transistor 30b) and, on its inverting terminal, a voltage signal $V_{TH}$ identifying the threshold $I_{TH}$ (by an appropriate voltage-to-current conversion, in itself obvious). The comparator 86 generates at output a digital signal $V_{OUT\_TH}$, which assumes the low logic level "0" when $I_{ON}<I_{TH}$ and the high logic level "1" when $I_{ON}\geq I_{TH}$ (or vice versa). In greater detail, the comparator 86 is configured to receive, at input on its non-inverting terminal, the voltage signal present on the source terminal of the HV transistor 30a (signal $V_{IN}^+$), and, at input on its inverting terminal, a threshold-voltage signal $V_{TH}$ such that $V_{TH}=I_{TH}\cdot(R^{HV}_{ON}+R^{LV}_{ON})$, where, as has already been said, $R^{HV}_{ON}$ is the ON-state resistance of the HV transistor 30a, and $R^{LV}_{ON}$ is the ON-state resistance of the LV transistor 30b. When the voltage on the source terminal of the HV transistor 30a exceeds the threshold $V_{TH}$, the output of the comparator 86 changes state to signal that the threshold has been exceeded (and thus to indicate that $I_L=I_{ON}\geq I_{TH}$).

The signal at output from the comparator 86 is supplied to the control logic 60. The control logic 60 monitors the duration of the time interval $T_{DELAY}$ and, when the time interval $T_{DELAY}$ has elapsed, turns off the HV transistor 30a.

Passage of the time interval $T_{DELAY}$ may alternatively be monitored by the comparator 86. In this case, the signal at output from the comparator 86 assumes a high logic level when $I_{ON}\geq I_{TH}$ and $t\geq T_{DELAY}$, and the control logic 60 turns off the HV transistor 30a at the rising edge of the digital signal generated by the comparator 86.

A second portion of the current detector 72 comprises a negative feedback loop including a comparator 89, which controls the current that flows on an output branch 90 of the current detector 72, by acting on the control terminal of a transistor 91 belonging to the output branch 90. The output branch 90 further comprises an additional transistor 92, connected in series to the transistor 91. Note that the transistor 92 is a low-voltage transistor, for example a CMOS. In particular, the transistor 92 is configured to operate with gate-to-source voltages in the range 1-5 V, in particular 2.5 V-3.6 V, for example at 3.3 V. Other low-voltage-transistor technologies envisage slightly higher operating voltages, for example in the region of 4-5 V.

In particular, the transistor 92 is of the same type as the LV transistor 30b, but is sized so that it has dimensions (measured in terms of width-to-length aspect ratio W/L) F times lower than the LV transistor 30b and is configured to conduct a current F times lower than the value assumed by $I_{ON}$ (current that flows through the LV transistor 30b). The LV transistor 30b and the transistor 92 further have their respective control terminals connected together and biased at the voltage $V_{DD}$.

The negative feedback loop of the current detector 72 controls the gate voltage of the transistor 91 so that the drain voltage of the transistor 92 will be equal to the voltage across the capacitor 88. In use, current always flows in the output branch 90. In the step of FIG. 4A, the current is variable and equal to $I_{ON}/F$, whereas in the step of FIG. 4B the current is constant and equal to $I_p/F$. Sizing of the transistor 92 guarantees that the current that flows in the output branch 90 is a fraction 1/F of the current $I_{ON}$ (or of its peak value $I_p$, as has been said).

The negative feedback, obtained by the comparator 89 and the transistor 91, ensures that the drain voltages of the transistors 30b and 92 will be identical. Consequently, the current that flows through the transistor 92 assumes values equal to the value of $I_{ON}$ scaled by the factor F (when $I_{ON}$ reaches the peak value $I_p$, this current will be equal to $I_p/F$). There is thus generated a scaled copy of the factor F of the peak current $I_p$. Since both of the transistors 30b and 92 are low-voltage transistors (e.g., CMOSs) they provide excellent matching properties so that the factor F is minimally affected by problems of mismatch between the transistors 30b and 92 (as, instead, would be the case, where the transistors 30b and 92 were high-voltage transistors). This enables a scaled copy of the peak current $I_p$ for being obtained that is stable and with reproducible value.

The negative feedback provided by the comparator 89 ensures that the signal at input to the non-inverting terminal of the comparator 89 and the signal at input to the inverting terminal of the comparator 89 are equal so that the LV transistor 30b and the transistor 92 have the same source-to-drain and drain-to-gate voltages.

A current mirror 90', made in a per se known manner, is used for repeating the current $I_{ON}/F$ that flows in the branch 90 and supplying it at output from the current detector 72.

The first current detector 72 further comprises a transistor 87 having a drain terminal common to the source terminal of the HV transistor 30a, and its source terminal coupled to a capacitor 88 (the second terminal of the capacitor 88 is connected to the reference voltage GND). The control terminal G of the transistor 87 is connected to the control terminal G of the HV transistor 30a and to a biasing terminal at the voltage $V_{GATE\_LS}$. In this way, the HV transistor 30a and the transistor 87 are driven into the ON/OFF state at the same time, using the same signal $V_{GATE\_LS}$ (in particular, with reference to FIG. 7, the signal generated at output from a first driving device 76).

During the time interval $T_{DELAY}$ (situation of FIG. 4A), the HV transistor 30a is ON (the signal $V_{GATE\_LS}$ has a value such as to drive the HV transistor 30a into the ON state). In the same way, also the transistor 87 is ON. The capacitor 88 is consequently charged at the voltage present on the first input terminal 25' of the rectifier circuit 24 (in the figure, the voltage across the capacitor 88 is designated by $V_{C\_SAMPLE}$).

The comparator 89 is connected to the source terminal of the transistor 87 and, when the transistor 87 is ON, it receives at input (on its non-inverting terminal) the voltage of the drain terminal of the LV transistor 30b, and at input (on its inverting terminal) the signal present on the drain terminal of the transistor 92 and on the source terminal of the transistor 91; the output of the comparator 89 is coupled to the control terminal G of the transistor 91. The transistor 91 is always ON; the comparator 89 biases the control terminal of the transistor 91 so that the current $I_{ON}/F$ flows in the branch 90, as is desired.

When the HV transistor 30a is OFF, also the transistor 87 is OFF, and the capacitor 88 is in the floating state, ensuring, during the time interval $T_{CHARGE}$, a current having a practically constant value through the transistor 92 and equal to $I_p/F$.

In fact, during the step of supply of the capacitor 27/load 28, the capacitor 88 ensures maintenance of the voltage $V_{C\_SAMPLE}$ across it, guaranteeing a substantially constant input signal (but for the losses of the capacitor 88) on the non-inverting input of the comparator 89. This enables generation of the current $I_{ON}/F$ for being kept unaltered on the output branch 90 of the first current detector 72 during the step of FIG. 4B (in this step, the current $I_{ON}$ has reached the peak value $I_p$, and consequently a current $I_p/F$ flows in the output branch 90 of the first current detector 72).

To return to FIG. 7, the control circuit 70 further comprises a second current detector 74, coupled between the source terminal S and the drain terminal D of the LV transistor 31b. The second current detector 74 is configured to detect the value of current $I_{OUT}$ that flows through the LV transistor 31b during the operating step of FIG. 4B, i.e., following upon charging of the capacitor 27. In particular, the second current detector 74 co-operates with the control logic 60 in order to detect whether the current $I_L=I_{OUT}$ through the LV transistor 31b reaches the minimum value envisaged $I_{OFF}=I_p/K$. The output signal of the second current detector 74, which indicates the value of current through the LV transistor 31b, is supplied at input to the control logic 60.

The second current detector 74 receives at input the current $I_{ON}/F$ (generated by the first current detector 72, as described previously), and switches when the current through the LV transistor 31b reaches the minimum value envisaged, given by $I_{OFF}=I_p/K$.

The control circuit 70 further comprises the first driving device 76 and a second driving device 78, which are coupled, respectively, between the control logic 60 and the control terminal G of the HV transistor 30a and between the control logic 60 and the control terminal G of the HV transistor 31a. The first driving device 76 and the second driving device 78 are, in themselves, of a known type, and are configured to drive the transistors 30a, 31a into the opening/closing condition on the basis of a respective control signal received from the control logic 60. In particular, in the operating condition of FIG. 4A (positive half-wave of the transduced signal $V_{TRANSD}$), the control logic 60 drives, via the first driving device 76, the HV transistor 30a into the ON state and, via the second driving device 78, the HV transistor 31a into the ON state. On the basis of the signal generated at output from the first current detector 72, the control logic 60 detects whether the current $I_L=I_{ON}$ has reached (and/or exceeded) the threshold value $I_{TH}$ and whether the time $T_{DELAY}$ has elapsed: if so, the control logic 60 drives, via the first driving device 76, the HV transistor 30a into the OFF state and, via the second driving device 78, maintains the HV transistor 31a in the ON state. Then, the control logic 60 monitors, on the basis of the signal received from the second current detector 74, the value of the current $I_L=I_{OUT}$ through the LV transistor 31b to control passage from the operating condition of supply of the capacitor 27/load 28 (FIG. 4B) to the operating condition of storage of energy in the inductor 22b (FIG. 4A).

Figure 9:
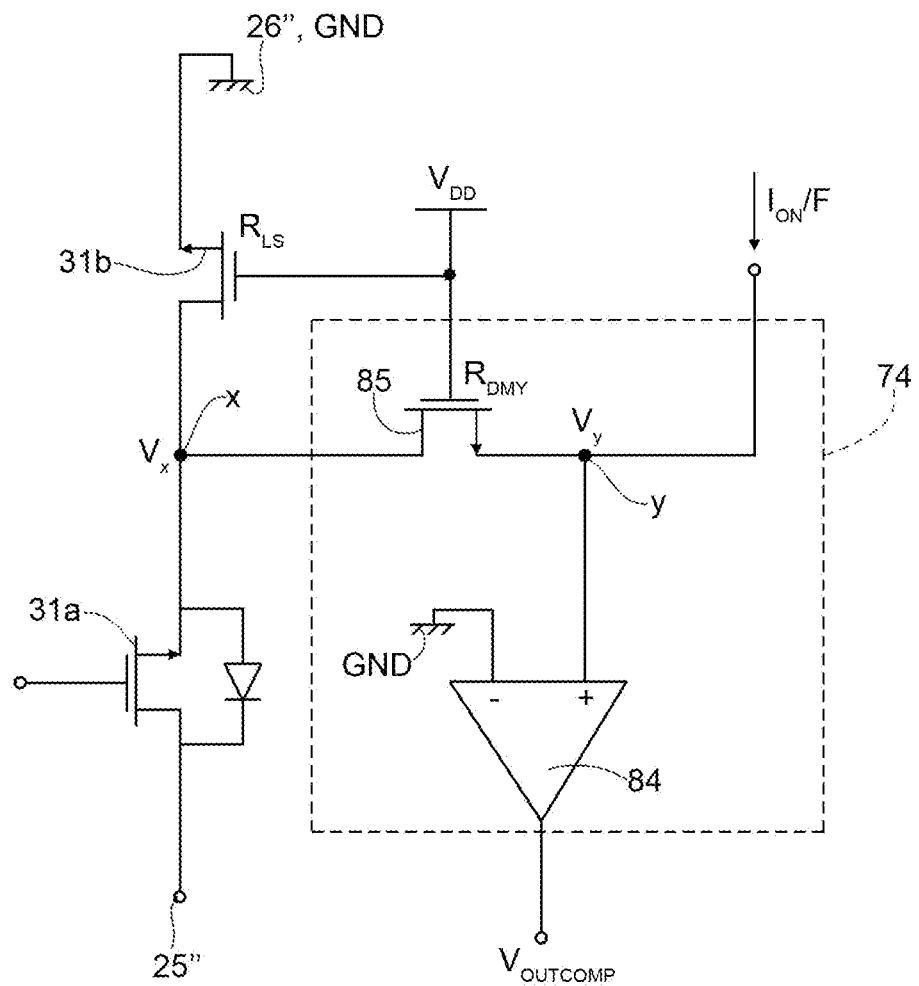
FIG. 9 shows a further current detector used in the energy harvesting system of FIG. 7.

FIG. 9 shows the second current detector 74 in greater detail.

The current detector 74 is electrically coupled to a node X set between the drain terminal D of the LV transistor 31b and the source terminal S of the HV transistor 31a, for receiving at input an intermediate voltage signal $V_X$ present on said node X. The current detector 74 includes a coupling transistor 85, of an N type, having its drain terminal coupled to the node X and its gate terminal biased at voltage $V_{DD}$. As in the case mentioned previously, the voltage $V_{DD}$ is chosen with a value such as to drive into the ON state the coupling transistor 85, which thus remains always ON during the operating steps of the energy harvesting system.

The current detector 74 further includes a comparator 84, having an inverting input electrically coupled to the reference voltage GND and a non-inverting input electrically coupled to the source terminal of the coupling transistor 85. In other words, the non-inverting input of the comparator 84 and the source terminal of the coupling transistor 85 are coupled to the same node Y, having a voltage $V_Y$. The node Y further receives the current signal $I_{ON}/F$ generated at output by the first current detector 72.

The comparator 84 generates at output a signal $V_{OUTCOMP}$ that is configured to assume alternatively a high logic value "1" and a low logic value "0" according to the value assumed by the signal $V_Y$.

The coupling transistor 85 presents in use an internal resistance (channel resistance, or ON-state resistance) $R_{DMY}=G \cdot R_{LS}$, where $R_{LS}$ is the internal resistance (channel resistance, or ON-state resistance) of the LV transistor 31b. In other words, the resistance $R_{DMY}$ is chosen equal to a multiple G of $R_{LS}$.

In use, it is found that the voltage $V_X$ on the node X is given by:

$$V_X = -I_L \cdot R_{LS}$$

and the voltage $V_Y$ on the node Y is given by $$V_Y = V_X + G \cdot R_{LS} \cdot I_{ON}/F$$

Thus, $$V_Y = -I_L \cdot R_{LS} + G/F \cdot I_{ON} \cdot R_{LS}$$

The output $V_{OUTCOMP}$ of the comparator 84 changes its logic value when the voltage $V_Y$ reaches the threshold defined by the reference voltage GND, in this example chosen equal to 0 V. We obtain that the output of the comparator 84 changes its logic value when $V_Y=0$. From this condition it follows that the output $V_{OUTCOMP}$ identifies the fact that, the value of scaled copy $I_{ON}/K$ has been reached by the output current $I_L=T_{OUT}$. In fact, setting $V_Y=0$ in the previous equation, we have that the threshold current $I_L$ (i.e., the threshold current $T_{OUT}$) is equal to $(G/F) \cdot I_{ON}$. The constant K is consequently equal to F/G. It is pointed out that, as illustrated previously, in use, the value of $I_{ON}$ at which there occurs passage from the step of FIG. 4A to the step of FIG. 4B is equal to $I_p$. Consequently, we find that the change of logic value of the signal $V_{OUTCOMP}$ identifies that the threshold $(G/F) \cdot I_p = I_p/K$ has been reached.

With reference once again to FIG. 7, the signal $V_{OUTCOMP}$ of the comparator 84 is received by the control logic 60, which controls, on the basis of the value of $V_{OUTCOMP}$ received, passage from the step of FIG. 4B to the step of FIG. 4A. For instance, a value $V_{OUTCOMP}$="0" identifies a situation in which the current $I_{OUT}$ has not yet reached the threshold $I_{OFF}$; instead, a value $V_{OUTCOMP}$="1" identifies a situation in which $V_Y=0$ and the current $I_{OUT}$ has reached the threshold $I_{OFF}$.

Preferably, the transistors 31b, 92 and 85 are low-voltage transistors manufactured with the same technology (e.g., CMOS technology) so that they guarantee optimal matching properties such that the factor G is minimally affected by problems of mismatch between the transistors 31b, 92, and 85 (as instead would be the case, where both of the transistors were high-voltage transistors). Stabilizing G around a desired value corresponds to stabilizing the values of K and F around the values chosen. The parameter K thus has a minimal spread around the chosen and desired value.

According to one embodiment of the present invention, the transistors 92 (FIG. 8) and 85 (FIG. 9) are provided in the form of modular transistors. The transistors 92 and 85 may be obtained as a series or parallel combination of the same basic module for minimizing the mismatch between the factors F and G, and thus render the parameter K "stable".

For instance, the transistor 92 is formed by connecting, in parallel to one another, a plurality of basic modules (each module being a low-voltage MOSFET with aspect ratio $W_b/L_b$) so that the source terminals of each basic module are electrically connected together to a common source node, and the drain terminals of each basic module are electrically connected together to a common drain node. The gate terminals of each basic module are selectively driven into the ON state or the OFF state to form, in use, the transistor 92, the aspect ratio W/L of which is a multiple of the aspect ratio $W_b/L_b$ of each basic module. In this way, by turning on/turning off selectively one or more basic modules, it is possible to regulate the total amount of current carried by the transistor 92 and consequently regulate the value of the ratio 1:F between the transistor 92 and the transistor 30b.

A similar solution may be applied to form the transistor 85, with variable value of G. In this case, it is possible to connect, in parallel to one another, a plurality of series of basic modules of low-voltage MOSFETs, which have the same aspect ratio (for example, $W_b/L_b$). Each series of basic modules presents, in use, a respective electrical resistance to the passage of the current. By selectively activating/deactivating the series of the basic modules that form the transistor 85, it is thus possible to regulate the value of electrical resistance represented by the transistor 85 in use. The transistor 85 behaves as a resistor with a variable resistance that may be selected according to the requirement.

Consequently, the values of F and G may be chosen according to the need, as a function of the value of the parameter K that it is desired to use for the specific application.

Turning-on/turning-off of the basic modules of the transistors 85 and 92 is performed by the control logic during use. For this purpose, the control logic includes a memory 83 that stores the information regarding which and/or how many basic modules of the transistors 85 and 92 are for being turned on. If the memory 83 is of the re-writeable type, this information may be updated/modified according to the need.

The transistors 30b, 92 and 85 are the components via which we it is possible to control $I_{TH}$, the factors F and G, and consequently the factor K. By providing them in a modular form, as has been described, they may be readily configured via the memory 83 and appropriate driving devices, for enabling/disabling a certain number of basic modules thus obtaining respective equivalent transistors, which have a desired respective aspect ratio W/L.

Thus, with just one device, appropriately configured via the information stored in the integrated memory 83, it is possible to vary freely $I_{TH}$, $T_{DELAY}$ and K and thus adapt to a very wide range of transducers available on the market.

With reference to FIG. 10, a control circuit 70' is illustrated for driving both of the HV transistors 30a and 31a into the ON/OFF state in order to implement the operating conditions of charging of the inductor 22b and supply of the capacitor 27 (and/or load 28) for positive half-waves ($V_{IN}^+$) and negative half-waves ($V_{IN}^-$) of the input signal $V_{IN}$.

Elements of the control circuit 70' that are similar to elements of the control circuit 70 of FIG. 7 are designated by the same reference numbers and will not be described any further.

The control circuit 70' comprises, in addition to what has already been described with reference to the control circuit 70 of FIG. 7, a third current detector 72', and a fourth current detector 74'.

The third current detector 72' is similar to the first current detector 72, and consequently is not described and illustrated any further in the figures. The third current detector 72', unlike the first current detector 72, is electrically coupled between the reference terminal GND (corresponding to the source terminal of the LV transistor 31b) and the drain terminal of the LV transistor 31b, and generates at output a current signal $(I_{ON}/F)'$.

The fourth current detector 74' is similar to the second current detector 74, and consequently is not described and illustrated any further in the figures. The fourth current detector 74', unlike the second current detector 74, is electrically coupled between the reference terminal GND (corresponding to the source terminal of the LV transistor 30b) and the drain terminal of the LV transistor 30b, and further receives at input the current signal $(I_{ON}/F)'$ generated by the third current detector 72'.

Operation of the third and fourth current detectors is altogether similar to what has already been described with reference to the first and second current detectors 72 and 74 and consequently is immediately evident to a person skilled in the branch.

In use, when a positive half-wave of the input signal $V_{IN}$ is detected, the control logic 60 monitors just the signals generated at output from the first signal detector 72 ($V_{OUT\_TH}$) and from the second signal detectors 74 ($V_{OUT\ COMP}$) to evaluate passage from the step of charging of the inductor 22b to the step of supply of the capacitor 27/load 28, and vice versa. Instead, when a negative half-wave of the input signal $V_{IN}$ is detected, the control logic 60 monitors just the signals generated at output from the third signal detector 72' ($V_{OUT\_TH}'$) and from the fourth signal detectors 74' ($V_{OUTCOMP}'$) to evaluate passage from the step of charging of the inductor 22b to the step of supply of the capacitor 27/load 28, and vice versa.

The control logic 60 implements the method for control of the HV transistors 30a, 30b, 31a and 31b described previously and illustrated schematically in FIG. 11, by a flowchart.

Figure 11:
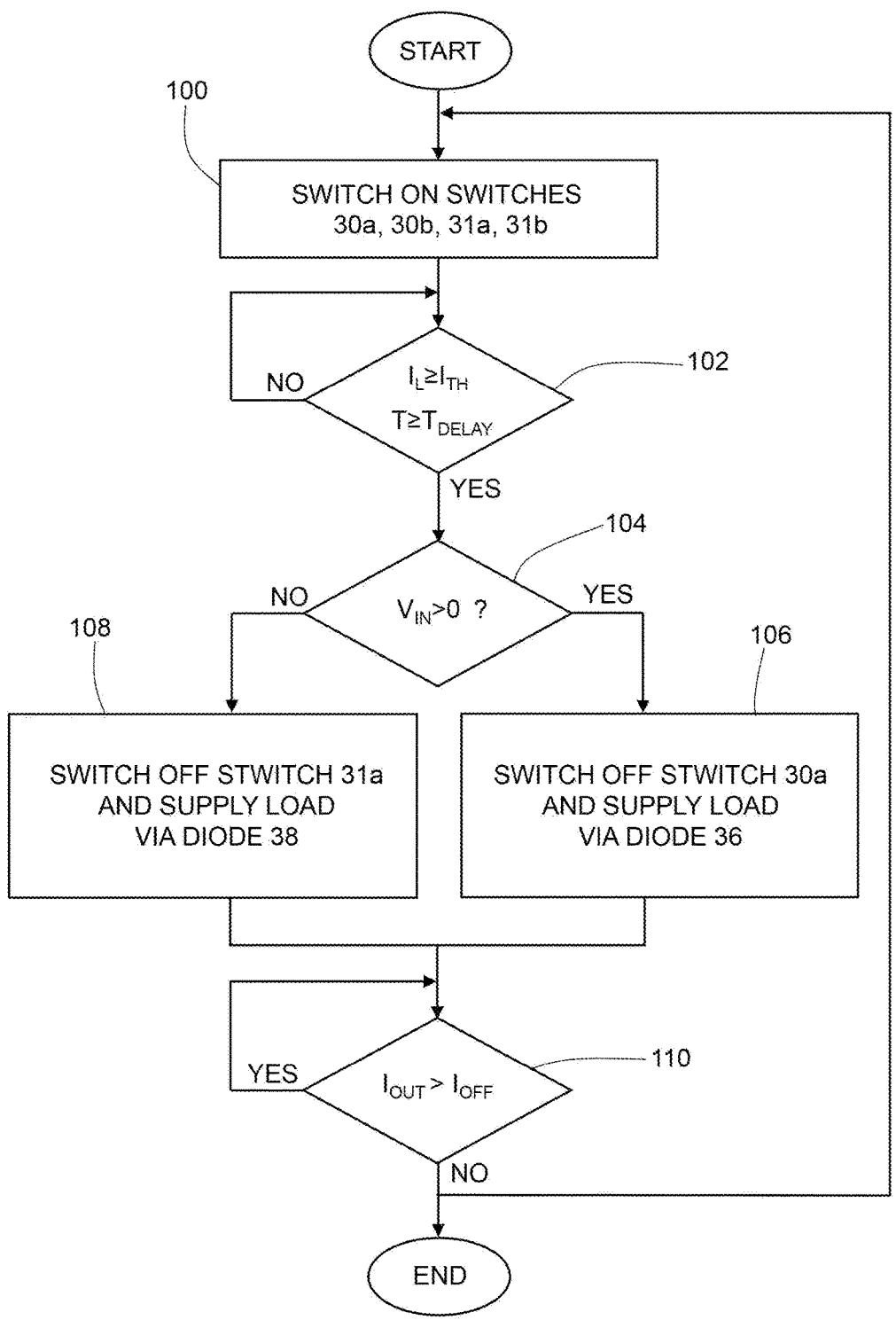
FIG. 11 shows, by a flowchart, steps of a method for operating the energy harvesting system of FIG. 3A, 3B, 7 or 10.

With reference to FIG. 11 (step 100), the HV transistors 30a and 31a are closed. It is considered in the sequel of the description that the LV transistors 30b and 31b will always be in the closed state (situation of FIG. 3B).

In this way, the inductor 22b is charged via the current $I_L = I_{ON}$ that flows through the HV transistors 30a and 31a.

The value of current $I_L = I_{ON}$ is monitored (step 102) for detecting whether it reaches (or exceeds) the required threshold value $I_{TH}$. At the same time, the control logic 60 monitors the time interval $T_{DELAY}$. In this case, the time t0 of start of the time interval $T_{DELAY}$ corresponds to the instant of closing of the HV transistors 30a, 31a, according to step 100.

In the case where the current $I_L$ has not reached the threshold $I_{TH}$ or the time $T_{DELAY}$ has not elapsed (output NO from step 102), it is necessary to wait for both of these conditions for being satisfied and the control logic 60 maintain the system 20 in the states 100, 102 until the condition $I_L \geq I_{TH}$ is satisfied. Otherwise (output YES from step 102), control passes to the next step 104.

In step 104 a check is made to verify whether the input voltage $V_{IN}$ has positive or negative polarity. This operation may be performed by the comparator 86, which receives the signal $V_{IN}^+$ at input.

As has already been said, a circuit equivalent to what is illustrated in FIG. 8 is coupled (in a way not illustrated in the figure) to the HV transistor 31a, and used in a similar way for receiving the signal with negative polarity $V_{IN}^-$.

In the case where the input voltage $V_{IN}$ has a positive polarity, control passes to step 106 (output YES from step 104), where the HV transistor 30a is opened, thus supplying the capacitor 27/load 28 via the diode 36.

In the case where the input voltage $V_{IN}$ has a negative polarity, control passes instead to step 108 (output NO from step 104), where the capacitor 27/load 28 is supplied via the diode 38.

From steps 106 and 108 control passes to step 110, where the control logic 60 monitors just one between the signals $V_{OUTCOMP}$ and $V_{OUTCOMP}'$ (from the second current detector 74 and, respectively, fourth current detector 74', according to the polarity of the input signal) to detect whether the current $I_{OUT}$ assumes a value equal to $I_{OFF}$. As long as $I_{OUT} > I_{OFF}$, the control logic 60 keeps the system 20 in the step of charging of the capacitor 27/supply of the load 28. When $I_{OUT} \leq I_{OFF}$, control returns to step 100. Steps 100-104 are carried out, as described with reference to FIGS. 5A-5c, in a time interval equal to at least $T_{DELAY}$ until the current in the inductor reaches the threshold $I_{TH}$, whereas steps 106-110 are carried out in a time interval equal to $T_{CHARGE}$.

The control logic 60 is, for example, a microcontroller, or finite-state machine, configured to drive the HV transistors 30a and 31a in order to execute the steps of the method of FIG. 11. In particular, the control logic is integrated in the same device that forms the energy harvesting interface according to the present invention (i.e., it is not an external component).

Figure 12:
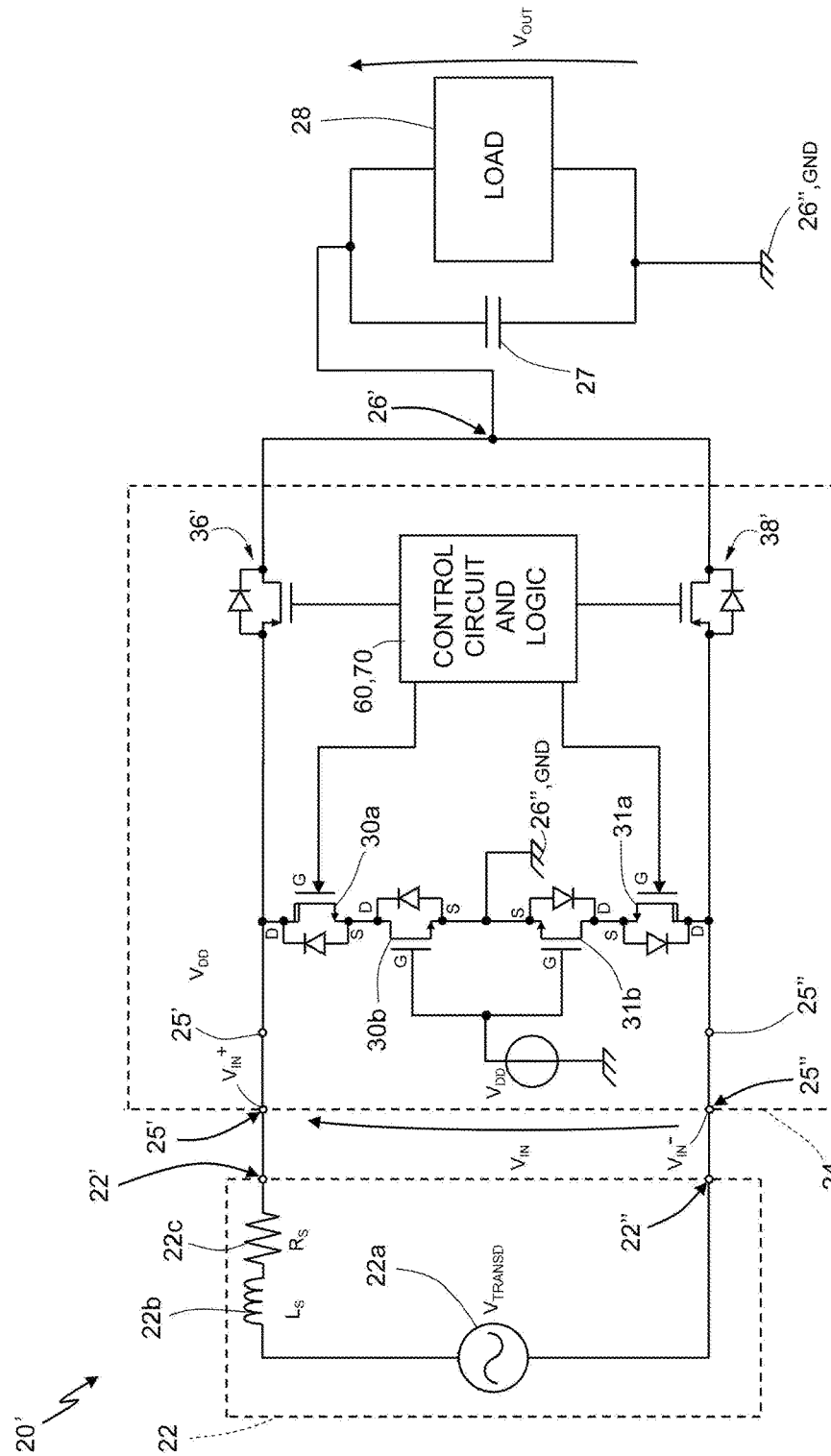
FIG. 12 shows an energy harvesting system according to a further embodiment.

According to an embodiment alternative to the one illustrated in FIGS. 3A and 3B, the diodes 36 and 38 may be replaced by a respective N-channel MOSFET, or by any active component appropriately controlled for implementing the step of the present invention. This embodiment is illustrated in FIG. 12 (energy harvesting system 20' which may also be used in the wind generator 200 of FIG. 14). These transistors are designated by the reference numbers 36' and 38', respectively. The transistors 36' and 38' are controlled in an active way, by actively driving them in conduction or inhibition. This control is carried out by the control logic 60, possibly by interposition of respective driving blocks. More in particular, the control logic 60 turns on the transistor 36' at positive half-waves of the input voltage $V_{IN}$ and as it verifies that the current $I_{ON}$ has reached the value $I_p$ for getting energy to flow to the capacitor 27/load 28. Likewise, the control logic 60 turns on the transistor 38' at negative half-waves of the input voltage $V_{IN}$ and at as it verifies that the current $I_{ON}$ has reached a value, in modulus, equal to $I_p$ for getting energy to flow to the capacitor 27/load 28.

Figure 13:
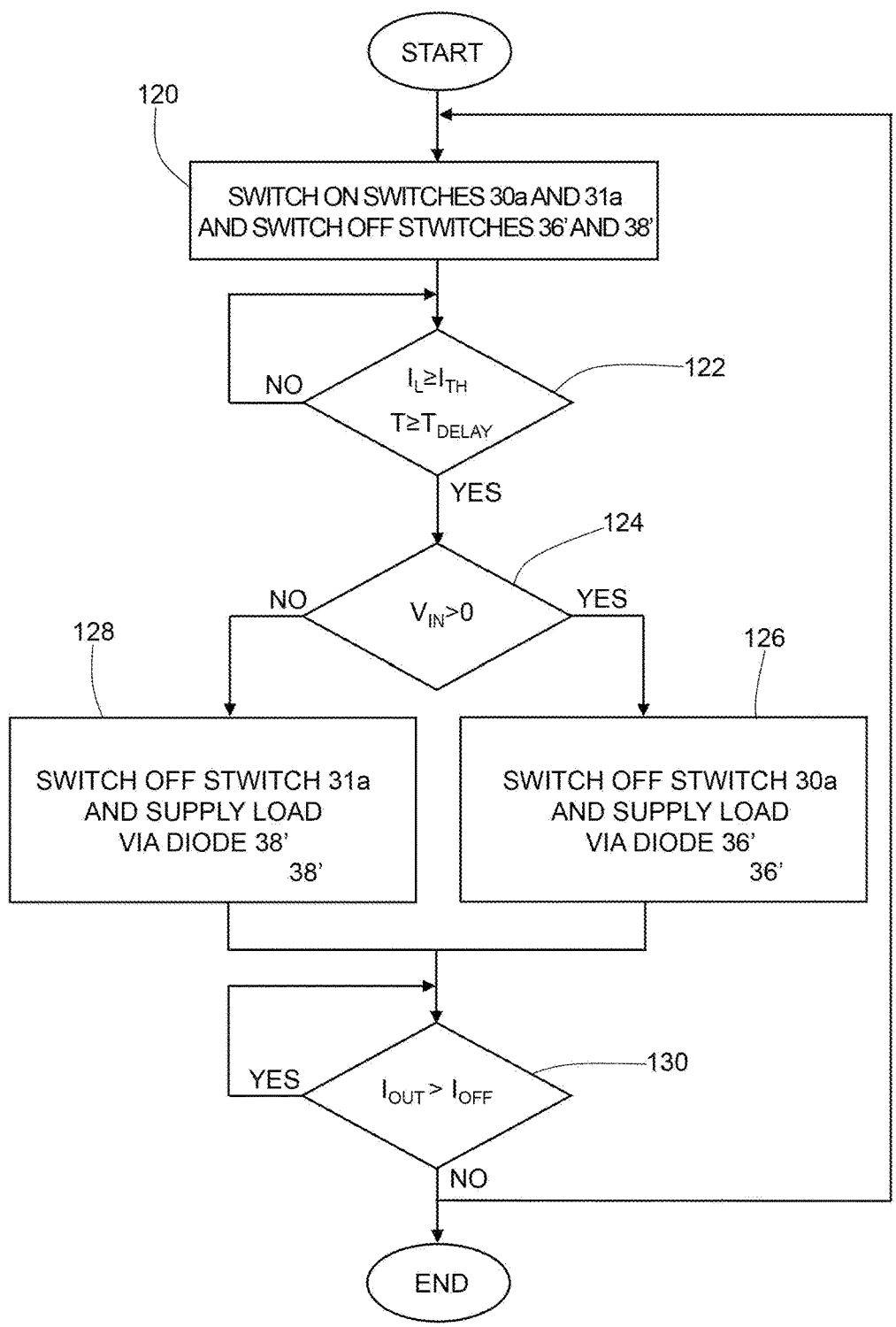
FIG. 13 shows, by a flowchart, steps of a method for operating the energy harvesting system of FIG. 12.

FIG. 13 shows, by a flowchart, a method for control of the HV transistors 30a, 30b, 31a, 31b, 36' and 38'.

With reference to FIG. 13 (step 120), the HV transistors 30a and 31a are closed. The transistors 36' and 38' instead, are opened. It is assumed, in the sequel of the description, that the LV transistors 30b and 31b are always in the closed state. In this way, the inductor 22b is charged via the current $I_L = I_{ON}$ that flows through the HV transistors 30a and 31a.

The value of current $I_L = I_{ON}$ is monitored (step 122) for detecting whether it reaches (or exceeds) the threshold value $I_{TH}$ required. At the same time, the control logic 60 monitors the time interval $T_{DELAY}$. In this case, the time $t_0$ of start of the time interval $T_{DELAY}$ corresponds to the instant of closing of the HV transistors 30a, 31a, according to step 120.

In the case where the current $I_L$ has not reached the threshold $I_{TH}$ or the time $T_{DELAY}$ has not elapsed (output NO from step 122), it is necessary to wait for both of these conditions for being satisfied, and the control logic 60 keeps the system 20 in the states 120, 122 until the condition $I_L \geq I_{TH}$ is satisfied. Otherwise (output YES from step 122), control passes to the next step 124.

In step 124, a check is made to verify whether the input voltage $V_{IN}$ has positive or negative polarity.

In the case where the input voltage $V_{IN}$ has a positive polarity, control passes to step 126 (output YES from step 124), where the HV transistor 30a is turned off and the transistor 36' is turned on, thus supplying the capacitor 27/load 28 via the transistor 36'.

In the case where the input voltage $V_{IN}$ has a negative polarity, control passes instead to step 128 (output NO from step 124), where the capacitor 27/load 28 is supplied via the transistor 38'.

From steps 126 and 128 control passes to step 130, where the control logic 60 monitors just one between the signals $V_{OUTCOMP}$ and $V_{OUTCOMP}'$ (according to the polarity of the input signal) to detect whether the current $I_{OUT}$ assumes a value equal to $I_{OFF}$. As long as $I_{OUT} > I_{OFF}$, the control logic 60 keeps the system 20 in the step of charging of the capacitor 27/supply of the load 28. When $I_{OUT} \leq I_{OFF}$, control returns to step 120.

From an examination of the characteristics of the invention provided according to the present disclosure the advantages that it affords emerge clearly.

In the first place, the implementations described herein enable optimization of use of the energy harvesting interface in such a way to maximize the efficiency in a way depending upon the environmental stimulus.

In particular, both $T_{DELAY}$ and the parameter K have a highly reproducible value (minimal spread) for increasing the performance, sturdiness, and efficiency of the system 20, 20', minimizing the mismatch between the positive polarity and negative polarity of the signal of the transducer and preventing phenomena of reversal of the flow of current from the capacitor 27 to the input terminals 25', 25" of the rectifier circuit 24.

The scavenging efficiency is likewise high even when the amplitude of the signal $V_{TRANSD}$ of the transducer 22 is lower than the voltage value stored in the capacitor 27, thus overcoming a limitation of the diode-bridge rectifier architecture.

Furthermore, since in the case of a transducer 22 of an electromagnetic type the rectifier 24 exploits the inductor 22b of the transducer 22, the scavenging efficiency is high even when the amplitude of the signal of the transducer is low. In this way, the limitation imposed by the diode-bridge rectifiers, which require a voltage of the transducer $V_{TRANSD}$ higher than $2V_{TH\_D}$, where $V_{TH\_D}$ is the threshold voltage of the diodes of the rectifier, is overcome.

The method described enables implementation of an active control (of the mean value and of the ripple) of the current supplied by the transducer, and enables an optimal impedance matching between the transducer 22 and the energy harvesting interface 24. This ensures a high efficiency $\eta_{SCAV}$ of the energy harvesting interface 24b irrespective of the conditions of storage of the energy in the capacitor 27.

Furthermore, as has been said, the value of the interval $T_{DELAY}$ may be varied according to the particular application in which the rectifier 24 operates. The rectifier 24 thus finds use in systems different from the energy harvesting system 20, 20', based upon electromagnetic transducers of any type.

In addition, the rectifier circuit 24 may be used with transducers of some other type, with interposition of an appropriate circuit between the transducer and the rectifier circuit configured to provide an energy accumulator similar to the inductor 22b.

Further, the rectifier 24 according to the present invention and the energy harvesting system 20, 20' are of a fully integrated type, and consequently require minimal installation space.

Finally, environmental-energy harvesting is obtained even when the signal of the transducer is lower than the voltage value stored on the output capacitor, which is not possible using a diode-bridge interface of a known type as illustrated in FIG. 1. According to the present invention, the energy harvesting interface 24 is thus able to harvest energy even when the power supplied by the transducer is very low.

Finally, it is clear that modifications and variations may be made to what has been described and illustrated herein, without thereby departing from the scope of the present invention, as defined in the annexed claims.

In particular, according to one embodiment, the rectifier circuit 24 may comprise a number of transistors different from what has been described. For instance, the rectifier circuit 24 may be a half-wave rectifier, comprising just the current detectors 72 and 74 or, alternatively, just the current detectors 72' and 74'. Use of a half-wave rectifier may be advantageous in the case where the input signal $V_{IN}$ is of a known type and comprises only positive (or negative) half-waves. Its use is, however, not recommended (albeit possible) in energy harvesting systems in so far as part of the input signal would be lost, at the expense of the efficiency of the system as a whole.

Furthermore, it is not always necessary for both the conditions $t > T_{DELAY}$ and $I_L > I_{TH}$ expressed with reference to the operating condition of FIG. 4A for being satisfied. In particular, for voltage signals generated by transducers 22 of a known type, the voltage value always reaches peaks such as to enable the threshold $I_{TH}$ for being exceeded within the time $T_{DELAY}$. Furthermore, an appropriate choice of $T_{DELAY}$ always guarantees, for practical purposes, reaching of a minimum acceptable threshold $I_{TH}$.

In addition, there may be present a plurality of transducers 22, indifferently all of the same type or of different types. For instance, the transducer/transducers may be chosen in the group comprising: electrochemical transducers (configured to convert chemical energy into an electrical signal), electromechanical transducers (configured to convert mechanical energy into an electrical signal), electro-acoustic transducers (configured to convert variations of acoustic pressure into an electrical signal), electromagnetic transducers (configured to convert a magnetic field into an electrical signal), photo-electric transducers (configured to convert light energy into an electrical signal), electrostatic transducers, thermoelectric transducers, piezoelectric transducers, thermo-acoustic transducers, thermomagnetic transducers, and thermo-ionic transducers.

The invention claimed is:

1. An energy harvesting interface, comprising:
 a transducer coupled to input terminals and configured to generate a transduced electrical signal as a function of an environmental stimulus applied to the transducer, wherein the transducer is of a resonant type configured to generate the transduced electrical signal having a resonance frequency that uniquely identifies a current value of said environmental stimulus;
 a first energy storage element coupled to the input terminals;
 an input energy recirculation circuit configured to charge the first energy storage element from the transduced electrical signal;
 an output energy transfer circuit configured to supply output terminals with an electrical supply signal that is a function of the energy stored in the first energy storage element; and
 a control logic configured to control the input energy recirculation circuit and the output energy transfer circuit to:
  store said electrical energy in the first energy storage element during a storage time interval and until the electrical energy stored in the first energy storage element reaches a first threshold value;
  supply the output terminals through the output energy transfer stage by discharging the first energy storage element after the storage time interval has elapsed; and
  supply the output terminals as long as the electrical supply signal has a value higher than a second threshold value, and
 means for sensing the current value of said environmental stimulus, wherein the means for sensing is configured to sense said resonance frequency;
 wherein the storage time interval and the second threshold value are set as a function of the sensed current value of said environmental stimulus.

2. The energy harvesting interface according to claim 1, wherein the control logic includes a memory that stores a database, said database comprising a plurality of first fields, each first field storing a respective pair of configuration values associated to the storage time interval and to the second threshold value, and a plurality of second fields, each second field storing a respective value of said environmental stimulus, the control logic further configured to identify which of the second fields of the database stores a value closest to said current value of environmental stimulus, and set the storage time interval and the second threshold value associated to the second field identified.

3. The energy harvesting interface according to claim 1, wherein the input energy recirculation circuit comprises:
 a first switch and a second switch connected in series with each other between a first input terminal and a second output terminal; and
 a third switch and a fourth switch connected in series with each other between a second input terminal and the second output terminal, and
 wherein the output energy transfer circuit comprises:
  a first charge-transfer element connected between the first input terminal and a first output terminal; and
  a second charge-transfer element connected between the second input terminal and the first output terminal, and
 further comprising:
  a first electrical-signal sensing device coupled to the terminals of the second switch and configured to detect whether the electric storage current that flows through the second switch reaches a first threshold value, said electric storage current being associated to the electrical charge stored in the first energy storage element; and
  a second electrical-signal sensing device coupled to the terminals of the fourth switch and configured to detect whether the electric supply current that flows through the fourth switch reaches a second threshold value lower than the first threshold value,
 the control logic further configured to:
  close the first, second, third, and fourth switches at least for the storage time interval and until the electric storage current reaches the first threshold value;
  open the first switch generating the electric supply current for supplying a second energy storage element through the first charge-transfer element by discharging the first energy storage element; and
  keep the first switch open as long as the value of electric supply current is higher than said second threshold value.

4. The energy harvesting interface according to claim 3, wherein, when the first threshold value has been reached, the first and second electric-signal sensing devices co-operate for generating said second threshold value.

5. The energy harvesting interface according to claim 4, wherein the first electrical-signal sensing device comprises:
 a first comparator coupled to the terminals of the second switch for comparing the value of the electric storage current with the first threshold value; and
 a current mirror configured to generate a scaled copy, scaled by a first proportionality factor, of the electric storage current; and
 wherein the second electrical-signal sensing device comprises:
  a scaling resistor having a resistance value that is equal to the value of resistance of the fourth switch multiplied by a second proportionality factor and coupled between the fourth switch and an intermediate node, and configured to generate, at the intermediate node, a sum voltage signal given by the sum of the voltage signal across the fourth switch, which is a function of the output current, and the voltage signal across the scaling resistor, which is a function of said scaled copy of the electric storage current; and
  a second comparator having a first conduction terminal biased at a zero reference-voltage value and a second conduction terminal coupled to the intermediate node and configured to generate a comparison signal identifying a condition where the sum voltage signal has a substantially zero value.

6. The energy harvesting interface according to claim 5, wherein the condition where the sum voltage signal has the substantially zero value corresponds to a signal of output electric supply current that flows through the third and fourth switches equal to the peak value of the electric storage current reduced according to a third proportionality factor that is equal to the first proportionality factor divided by the second proportionality factor.

7. The energy harvesting interface according to claim 6, wherein said peak value reduced by the third proportionality factor is said second threshold value, and wherein the values stored in the first fields of the database, associated to a respective second threshold value, are respective values of the third proportionality factor.

8. The energy harvesting interface according to claim 1, wherein the transducer is of an electromagnetic type including an inductor, said first energy storage element being the inductor of said transducer of an electromagnetic type.

9. An energy harvesting system configured to supply an electrical load, comprising:
an electrical-energy harvesting interface comprising:
a transducer coupled to input terminals and configured to generate a transduced electrical signal as a function of an environmental stimulus applied to the transducer, wherein the transducer is of a resonant type configured to generate the transduced electrical signal having a resonance frequency that uniquely identifies a current value of said environmental stimulus;
an energy storage element coupled to the input terminals;
an input energy recirculation circuit configured to charge the energy storage element from the transduced electrical signal;
an output energy transfer circuit configured to supply output terminals with an electrical supply signal that is a function of energy stored in the energy storage element; and
a control logic configured to control the input energy recirculation circuit and the output energy transfer circuit to:
store electrical energy in the energy storage element during a storage time interval and until the electrical energy stored in the energy storage element reaches a first threshold value;
supply the electrical load through the output energy transfer stage by discharging the energy storage element after the storage time interval has elapsed; and
supply the electrical load as long as the electrical supply signal has a value higher than a second threshold value, and
means for sensing the current value of said environmental stimulus, wherein the means for sensing is configured to sense said resonance frequency;
wherein the storage time interval and the second threshold value are set as a function of the sensed current value of said environmental stimulus; and
an electrical-energy accumulator coupled to the output terminals of the electrical-energy harvesting interface for receiving at input the electrical supply signal and is configured to store electrical energy to supply the electrical load.

10. The system according to claim 9, further comprising a DC-DC converter connected between the electrical-energy accumulator and the electrical load, said DC-DC converter being configured to supply the electrical load via the electrical energy stored in the electrical-energy accumulator.

11. The system according to claim 9, wherein the transducer is selected from the group consisting of a wind generator, a solar generator, a thermoelectric generator, and a vibration-powered generator.

12. The system according to claim 9,
wherein the control logic includes a memory that stores a database, said database comprising a plurality of first fields, each first field storing a respective pair of configuration values associated to the storage time interval and to the second threshold value, and a plurality of second fields, each second field storing a respective value of said environmental stimulus,
the control logic further configured to identify which of the second fields of the database stores a value closest to said current value of environmental stimulus, and set the storage time interval and the second threshold value associated to the second field identified.

13. A method for harvesting energy by means of an energy harvesting interface having input terminals and output terminals for coupling to an electrical load to be supplied by means of an electrical supply signal, the method comprising the steps of:
generating by a transducer of a resonant type an electrical input signal as a function of an environmental stimulus, the transduced electrical signal having a resonance frequency that uniquely identifies a current value of said environmental stimulus;
charging an energy storage element coupled to the input terminals from the electrical input signal during a storage time interval and until the electrical energy stored in the storage element reaches a first threshold value;
sensing the current value of the environmental stimulus, wherein sensing comprises sensing the resonance frequency;
setting a value of the storage time interval as a function of the sensed current value of said environmental stimulus;
setting a second threshold value as a function of said sensed current value of the environmental stimulus; and
supplying the electrical load with the electrical supply signal generated from the energy stored in the storage element by discharging the storage element after the storage time interval has elapsed, said supplying the electrical load continuing as long as the electrical supply signal has a value higher than a second threshold value.

14. The method according to claim 13, further comprising the steps of:
defining a database comprising a plurality of first fields and a plurality of second fields;
storing, in the first fields of the database, a respective pair of configuration values respectively associated to the storage time interval and to the second threshold value;
storing, in the second fields of the database, a respective value of said environmental stimulus;
identifying which of the second fields of the database stores the value closest to said sensed current value of environmental stimulus; and
setting the storage time interval and the second threshold value associated to the second field identified.

* * * * *

UNITED STATES PATENT AND TRADEMARK OFFICE
CERTIFICATE OF CORRECTION

PATENT NO. : 10,211,722 B2
APPLICATION NO. : 15/132958
DATED : February 19, 2019
INVENTOR(S) : Stefano Ramorini et al.

Page 1 of 1

It is certified that error appears in the above-identified patent and that said Letters Patent is hereby corrected as shown below:

In the Specification

At Column 15, Line number 51, please replace the equation [[$V_Y = -I_L \cdot R_{LS} G/F \cdot I_{ON} \cdot R_{LS}$]] with -- $V_Y = -I_L \cdot R_{LS} + G/F \cdot I_{ON} \cdot R_{LS}$ --.

Signed and Sealed this
Third Day of September, 2019

Andrei Iancu
*Director of the United States Patent and Trademark Office*